United States Patent
Noishiki et al.

(10) Patent No.: US 9,534,722 B2
(45) Date of Patent: Jan. 3, 2017

(54) FLOW PASSAGE STRUCTURE AND FLOW PASSAGE STRUCTURE MANUFACTURING METHOD

(75) Inventors: Koji Noishiki, Takasago (JP); Tomohiro Suzuki, Takasago (JP); Yasutake Miwa, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 328 days.

(21) Appl. No.: 14/235,311

(22) PCT Filed: Aug. 20, 2012

(86) PCT No.: PCT/JP2012/005213
§ 371 (c)(1),
(2), (4) Date: Jan. 27, 2014

(87) PCT Pub. No.: WO2013/035253
PCT Pub. Date: Mar. 14, 2013

(65) Prior Publication Data
US 2014/0166137 A1     Jun. 19, 2014

(30) Foreign Application Priority Data

Sep. 9, 2011   (JP) ................... 2011-197183

(51) Int. Cl.
*B01J 19/00*   (2006.01)
*F16L 41/02*   (2006.01)
*F28D 9/00*    (2006.01)

(52) U.S. Cl.
CPC .......... *F16L 41/02* (2013.01); *B01J 19/00* (2013.01); *B01J 19/0093* (2013.01); *F28D 9/00* (2013.01);
(Continued)

(58) Field of Classification Search
CPC ...... F16L 41/02; F16L 41/025; B01J 19/0093; B01J 2219/00783; B01J 2219/00786; B01J 2219/00804; B01J 2219/00813; F28D 9/00; Y10T 137/87652

See application file for complete search history.

(56) References Cited

U.S. PATENT DOCUMENTS 2,360,123 A * 10/1944 Gerstung ............... F01M 5/007
                                                       138/38
3,353,590 A * 11/1967 Holman .................. F01M 1/10
                                                       123/41.33
(Continued)

FOREIGN PATENT DOCUMENTS

DE      195 25 216 C1   11/1996
JP      59 60191         4/1984
(Continued)

OTHER PUBLICATIONS

Machine Translation of JP 2009228916.*
(Continued)

*Primary Examiner* — Kevin Murphy
(74) *Attorney, Agent, or Firm* — Oblon, McClelland, Maier & Neustadt, L.L.P.

(57) ABSTRACT

A flow passage structure is provided with a fluid flow passage that includes a plurality of straight flow passages, a first return bend that connects the downstream end of the straight flow passage through which a fluid flows from a second end surface toward a first end surface among the plurality of straight flow passages to the upstream end of the straight flow passage which is disposed at the downstream side of the straight flow passage and is adjacent to the straight flow passage, and a second return bend that connects the downstream end of the straight flow passage through which the fluid flows from the first end surface toward the second end surface among the plurality of straight flow passages to the upstream end of the straight flow passage (Continued)

which is disposed at the downstream side of the straight flow passage and is adjacent to the straight flow passage.

6 Claims, 14 Drawing Sheets

(52) U.S. Cl.
CPC ............... *B01J 2219/0099* (2013.01); *B01J 2219/00783* (2013.01); *B01J 2219/00786* (2013.01); *B01J 2219/00808* (2013.01); *B01J 2219/00813* (2013.01); *B01J 2219/00822* (2013.01); *B01J 2219/00873* (2013.01); *B01J 2219/00889* (2013.01); *B01J 2219/00891* (2013.01); *F28F 2260/02* (2013.01); *Y10T 137/0402* (2015.04); *Y10T 137/87571* (2015.04); *Y10T 137/87652* (2015.04)

(56) References Cited

U.S. PATENT DOCUMENTS

| | | | | |
|---|---|---|---|---|
| 4,614,231 A | * | 9/1986 | Proctor | ............... F25B 39/02 165/153 |
| 5,950,715 A | * | 9/1999 | Jonsson | ............... F28D 9/005 165/103 |
| 2004/0258572 A1 | * | 12/2004 | Haibara | ............... B01J 19/0093 422/400 |
| 2004/0265184 A1 | | 12/2004 | Matsuda et al. | |
| 2009/0087359 A1 | * | 4/2009 | Roberge | ............... B01J 19/0093 422/200 |
| 2011/0268616 A1 | | 11/2011 | Noishiki et al. | |

FOREIGN PATENT DOCUMENTS

| | | |
|---|---|---|
| JP | 9 79771 | 3/1997 |
| JP | 2004 16870 | 1/2004 |
| JP | 2004 314015 | 11/2004 |
| JP | 2007 85594 | 4/2007 |
| JP | 2009-228916 A | 10/2009 |
| JP | 2010 162428 | 7/2010 |

OTHER PUBLICATIONS

Written Opinion of the International Searching Authority Issued Sep. 11, 2012 in PCT/JP12/005213 Filed Aug. 20, 2012.
International Search Report Issued Sep. 11, 2012 in PCT/JP12/005213 Filed Aug. 20, 2012.
Extended European Search Report issued on Dec. 17, 2015 in European Patent Application No. 12829888.2.

* cited by examiner

FLOW PASSAGE STRUCTURE AND FLOW PASSAGE STRUCTURE MANUFACTURING METHOD

TECHNICAL FIELD

The present invention relates to a flow passage structure and a flow passage structure manufacturing method.

BACKGROUND ART

Hitherto, a flow passage structure has been known as a structure for mixing plural fluids so as to cause an interaction therebetween. The flow passage structure is used in, for example, a reaction device that obtains a desired reaction product by causing a chemical reaction between fluids as the interaction of plural reactant fluids. An example of the flow passage structure is disclosed in Patent Document 1 below.

Patent Document 1 below discloses the reaction device that uses a flow passage structure having plural circulation paths formed therein. Each circulation path includes a first introduction path into which a first reactant fluid is introduced, a second introduction path into which a second reactant fluid is introduced, a merging path which is connected to both downstream sides of both introduction paths and merges and mixes reactant fluids flowing through the respective introduction paths, and a reaction path which is connected to the downstream side of the merging path and causes a reaction between the reactants included in the fluids while circulating the fluids merged in the merging path. The flow passage structure is formed by laminating plural plates. The first introduction path and the second introduction path are formed in a front surface of one plate, and the reaction path is formed in a rear surface of the plate. The merging path connects the ends opposite to the reactant introduction sides of the first introduction path and the second introduction path and penetrates the plate from the front surface toward the rear surface so as to connect the ends to the end of the reaction path. Further, the reaction path is formed in a tortuous shape of which the flow passage length increases in order to promote the reaction between the reactants by increasing the merged reactant staying time. Specifically, the reaction path has a shape which is formed by alternately connecting a portion formed in the rear surface of the plate and extending toward one side of the plate in the width direction and a portion extending toward the opposite side to the one side at the downstream side of the portion.

However, in the flow passage structure of the related art, since the reaction path is formed in the above-described shape, it is difficult to clean the inside of the reaction path. Specifically, in a case where the reaction path is formed in the above-described shape, even when a cleaning unit is inserted from one end of the reaction path into the reaction path, the cleaning unit may not easily reach the deep inner portion thereof. For this reason, for example, when precipitate or foreign substance blocks the inside of the reaction path, the precipitate or foreign substance may not be easily removed. In this way, in the above-described flow passage structure, there are problems in which the inside of the reaction path may not be sufficiently cleaned and a considerable time is spent for cleaning operation.

CITATION LIST

Patent Document

Patent Document 1: JP 2010-162428 A

SUMMARY OF THE INVENTION

An object of the present invention is, in a flow passage structure, to sufficiently and easily clean the inside of a flow passage which circulates fluids and has a shape which is formed by alternately connecting a portion extending toward one side and a portion extending toward the other side at the downstream side thereof.

According to an aspect of the present invention, there is provided a flow passage structure with at least one introduction path into which a fluid is introduced and a fluid flow passage which circulates fluid introduced into the introduction path, the flow passage structure including: a body section that includes a first end surface and a second end surface facing the opposite side to the first end surface; a first lid section that is disposed so as to face the first end surface of the body section and is coupled to the body section in a removable manner; and a second lid section that is disposed so as to face the second end surface of the body section and is coupled to the body section in a removable manner, wherein the fluid flow passage includes a plurality of straight flow passages that extend between the first end surface and the second end surface inside the body section in a direction of connecting both end surfaces and is disposed in parallel with a gap in a direction intersecting the extension direction, a first return bend that connects the downstream end of the straight flow passage through which the fluid flows from the second end surface toward the first end surface among the plurality of straight flow passages to the upstream end of the straight flow passage which is disposed at the downstream side of the straight flow passage and is adjacent to the straight flow passage, and a second return bend that connects the downstream end of the straight flow passage through which the fluid flows from the first end surface toward the second end surface among the plurality of straight flow passages to the upstream end of the straight flow passage which is disposed at the downstream side of the straight flow passage and is adjacent to the straight flow passage, wherein the first return bend is opened at the first end surface, wherein the second return bend is opened at the second end surface, wherein the first lid section is coupled to the body section while contacting the first end surface so as to seal the opening of the first return bend formed in the first end surface, and wherein the second lid section is coupled to the body section while contacting the second end surface so as to seal the opening of the second return bend formed in the second end surface.

According to another aspect of the present invention, there is provided a method of manufacturing the flow passage structure including: forming a base member having a circulation path formed therein; cutting the base member along a first cutting line that extends in a direction intersecting the extension direction of each straight flow passage and passes through the first return bend and a second cutting line that extends in a direction intersecting the extension direction of each straight flow passage and passes through the second return bend; forming the body section by a portion between the first cutting line and the second cutting line of the base member cut in the cutting of the base member; forming the first lid section by a portion outside the first cutting line of the base member cut in the cutting of the base member; and forming the second lid section by a portion outside the second cutting line of the base member cut in the cutting of the base member.

DESCRIPTION OF EMBODIMENTS

Hereinafter, embodiments of the present invention will be described with reference to the drawings.

First, the configuration of a flow passage structure according to an embodiment of the present invention will be described with reference to FIGS. 1 to 14.

A flow passage structure 1 of this embodiment is used to cause plural fluids to be merged to one another for the interaction thereof. The flow passage structure 1 of this embodiment is used in, for example, a micro-reactor, a heat exchanger, a reaction device for an extractive reaction, or a mixing device for emulsification.

The flow passage structure 1 of this embodiment includes plural circulation paths 2 (see FIG. 3) that circulate a first fluid and a second fluid while being merged to one another for the interaction thereof and plural temperature control flow passages 3 (see FIG. 4) through which a temperature control fluid for controlling the temperature of the fluid flowing in the circulation paths 2 flows. The plural circulation paths 2 and the plural temperature control flow passages 3 are provided inside the flow passage structure 1 so as to be disposed in parallel in the thickness direction (the substrate lamination direction to be described later) of the flow passage structure 1 (see FIG. 7). Specifically, the respective portions of one circulation path 2 are disposed on one plane. Two temperature control flow passages 3 are separately disposed at both sides of the circulation path 2 in the thickness direction (a direction perpendicular to the one plane) of the flow passage structure 1. Then, one circulation path 2 and two temperature control flow passages 3 are set as one pair of flow passages, and plural sets of flow passages are disposed in parallel in the thickness direction of the flow passage structure 1.

Figure 1:
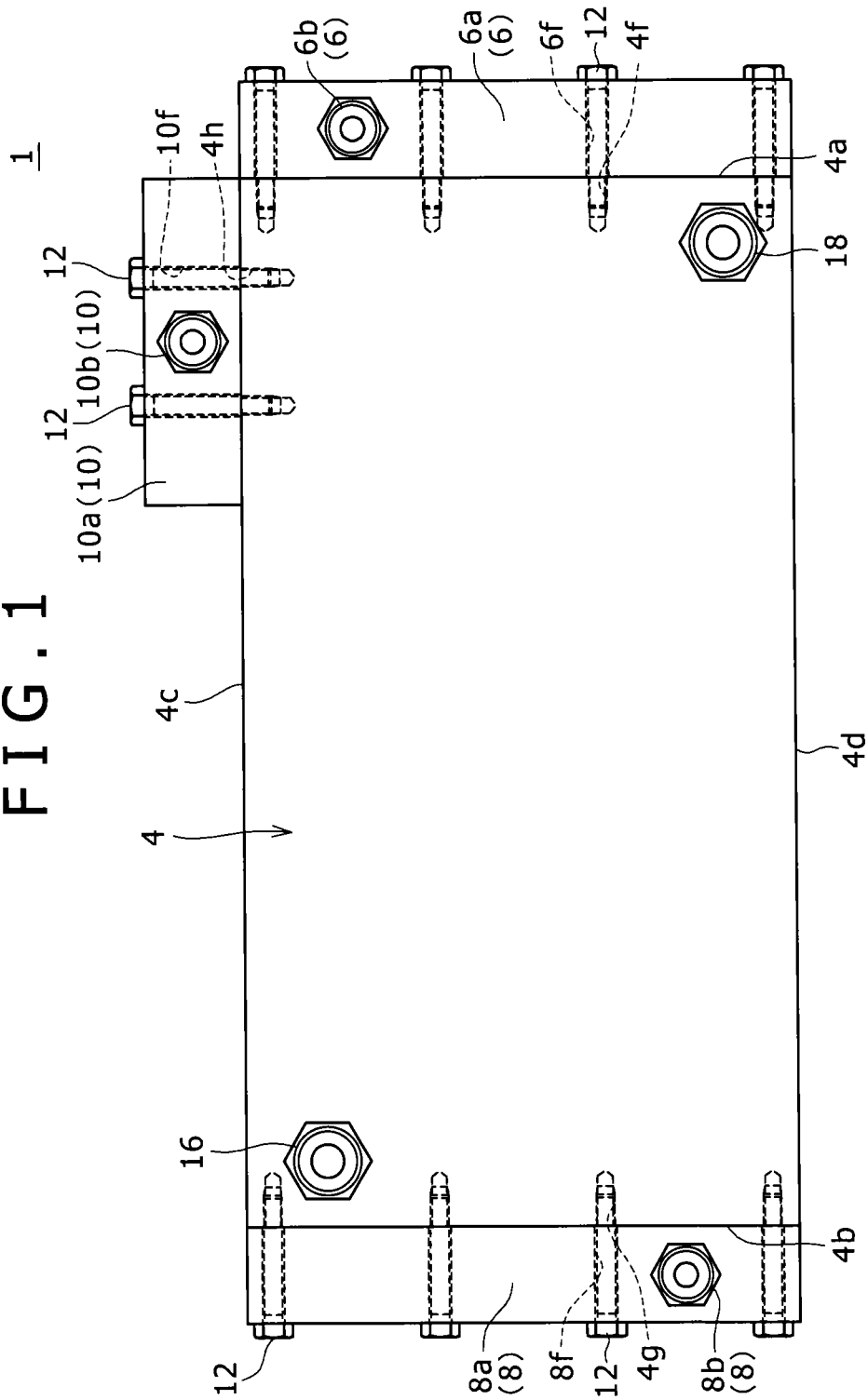
FIG. 1 is a top view of a flow passage structure according to an embodiment of the present invention.
Figure 2:
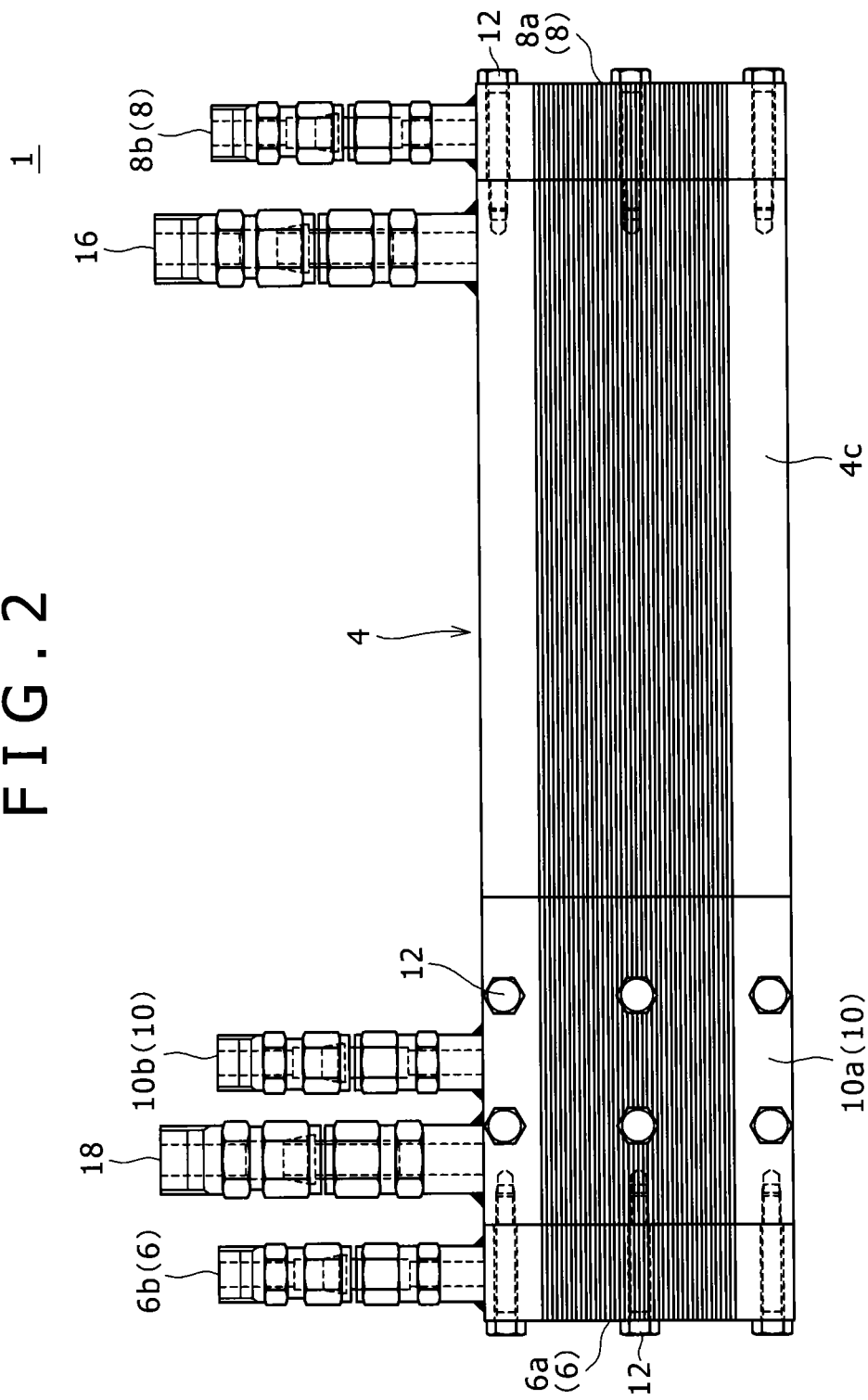
FIG. 2 is a view in which the flow passage structure according to the embodiment of the present invention is seen toward a third end surface.
Figure 3:
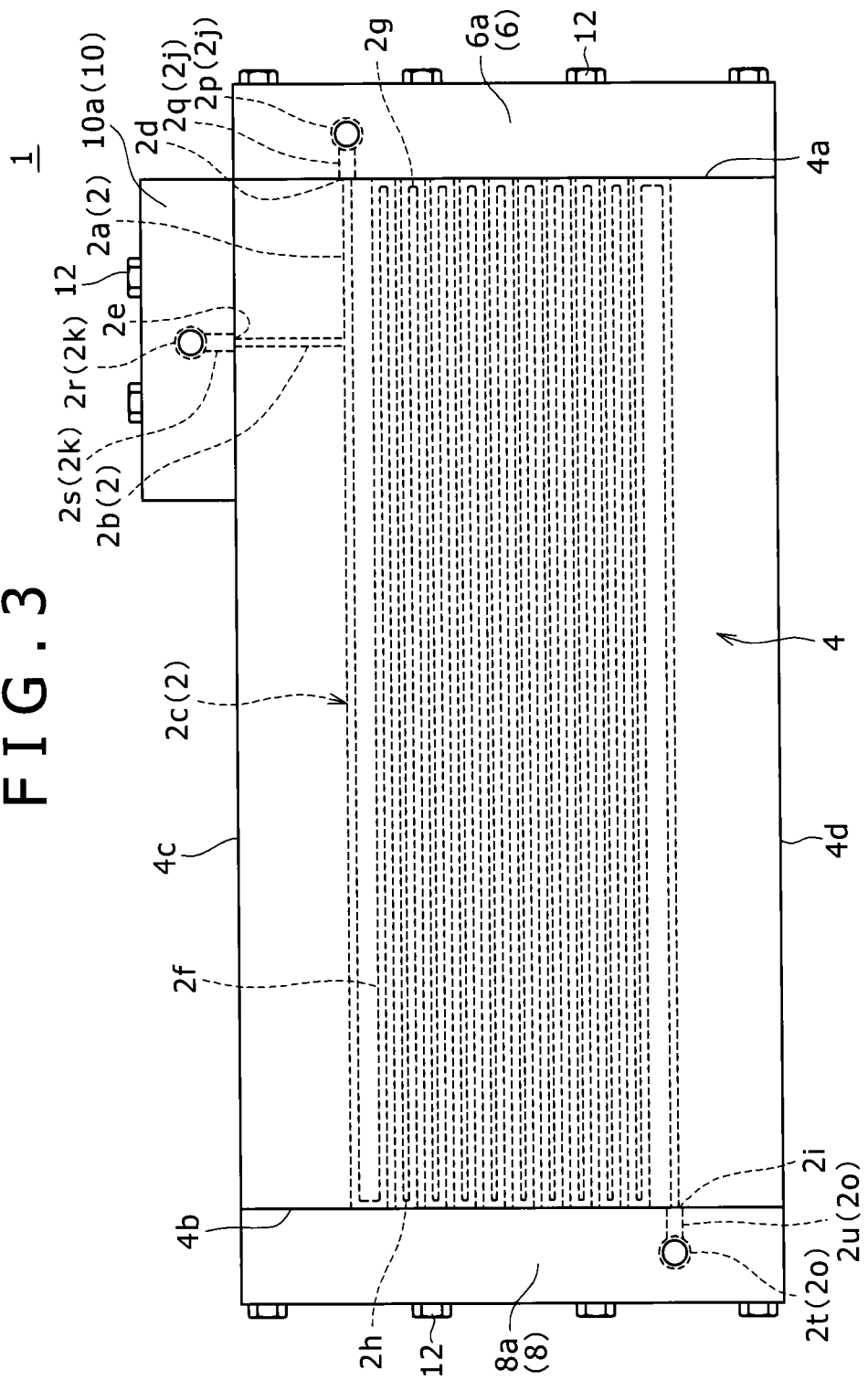
FIG. 3 is a diagram illustrating arrangement of a circulation path of the flow passage structure illustrated in FIG. 1.

Each circulation path 2 is a micro-channel with a minute flow passage diameter. As illustrated in FIG. 3, the circulation path 2 includes a first introduction path 2a into which the first fluid is introduced, a second introduction path 2b into which the second fluid is introduced, and a merged fluid flow passage 2c that circulates both fluids introduced into both introduction paths 2a and 2b in a merged state.

The first introduction path 2a is disposed at the position near one end of the flow passage structure 1 in the longitudinal direction and near one end surface of the lateral direction perpendicular to the longitudinal direction of the flow passage structure 1. The first introduction path 2a extends straightly in the longitudinal direction of the flow passage structure 1. The first introduction path 2a includes a first introduction port 2d that is used to introduce the first fluid into the first introduction path 2a. Furthermore, the first introduction path 2a is included in concept of the specific introduction path of the present invention.

The second introduction path 2b is disposed at the position near one end of the flow passage structure 1 in the longitudinal direction. The second introduction path 2b extends straightly from one end surface of the flow passage structure 1 in the lateral direction toward the opposite end surface. The second introduction path 2b extends in a direction perpendicular to the first introduction path 2a. Further, the second introduction path 2b includes a second introduction port 2e that is used to introduce the second fluid into the second introduction path 2b.

The merged fluid flow passage 2c is included in the concept of the fluid flow passage of the present invention. The merged fluid flow passage 2c has a tortuous shape which is formed by alternately connecting a portion that extends straightly toward one side of the flow passage structure 1 in the longitudinal direction and a portion that is folded back from the portion and extends straightly toward the other side opposite to the one side. Specifically, the merged fluid flow passage 2c includes plural straight flow passages 2f, plural first return bends 2g, and plural second return bends 2h.

The straight flow passages 2f form the portions that extend straightly in the longitudinal direction of the flow passage structure 1 in the merged fluid flow passage 2c. The plural straight flow passages 2f are disposed in parallel to one another. The plural straight flow passages 2f are disposed in parallel with a gap therebetween in the lateral direction of the flow passage structure 1.

Each first return bend 2g is a portion that connects one-side ends of a portion that extends straightly toward one side in the longitudinal direction of the flow passage structure 1 in the merged fluid flow passage 2c and a portion that is disposed at the downstream side of the portion and extends straightly toward the opposite side to the one side. That is, the first return bend 2g connects the ends near the first introduction paths 2*a* in the adjacent straight flow passages 2*f* in the lateral direction of the flow passage structure 1. The flow passage is folded back by the first return bend 2*g* from the straight flow passage 2*f* that is disposed at the upstream side of the first return bend 2*g* and extends toward the one end to the straight flow passage 2*f* that is disposed at the downstream side of the first return bend 2*g* and extends toward the opposite side to the one end.

Each second return bend 2*h* is a portion that connects the ends opposite to the one-side ends of a portion that extends straightly toward the opposite side to the one end in the longitudinal direction of the flow passage structure 1 in the merged fluid flow passage 2*c* and a portion that is disposed at the downstream side of the portion and extends straightly toward the one end. That is, the second return bend 2*h* connects the ends that are located at the opposite side to the first introduction path 2*a* in the longitudinal direction of the flow passage structure 1 in the adjacent straight flow passages 2*f* in the lateral direction of the flow passage structure 1. The flow passage is folded back by the second return bend 2*h* from the straight flow passage 2*f* that is disposed at the upstream side of the second return bend 2*h* and extends toward the opposite side to the one end to the straight flow passage 2*f* that is disposed at the downstream side of the second return bend 2*h* and extends toward the one end.

Further, the merged fluid flow passage 2*c* includes a derivation port 2*i* that derives the fluid from the merged fluid flow passage 2*c*. The derivation port 2*i* is provided at the downstream end of the merged fluid flow passage 2*c*.

Further, the flow passage structure 1 is provided with a first supply flow passage 2*j* that distributes and supplies the first fluid to the first introduction port 2*d* of the first introduction path 2*a* of each circulation path 2, a second supply flow passage 2*k* that distributes and supplies the second fluid to the second introduction port 2*e* of the second introduction path 2*b* of each circulation path 2, and a collection flow passage 2*o* that collects the fluid derived from the derivation port 2*i* of the merged fluid flow passage 2*c* of each circulation path 2 in a merged state. Furthermore, the first supply flow passage 2*j* is included in the concept of the supply flow passage of the present invention.

The first supply flow passage 2*j* includes a first supply hole 2*p* and a first supply flow passage connection section 2*q*. The first supply hole 2*p* is opened at one end surface of the flow passage structure 1 in the thickness direction and extends from the opening toward the other end surface of the flow passage structure 1 in the thickness direction so as to reach a position corresponding to the circulation path closest to the other end surface in the plural circulation paths 2. A first supply side connector 6*b* to be described later is connected to the first supply hole 2*p*. The first fluid is supplied to the first supply hole 2*p* through the first supply side connector 6*b*. The first supply flow passage connection section 2*q* extends from a position corresponding to the circulation path 2 closest to the one end surface of the flow passage structure 1 in the thickness direction among the plural circulation paths 2 to a position corresponding to the circulation path 2 closest to the other end surface in the thickness direction of the flow passage structure 1. The first supply flow passage connection section 2*q* communicates with the first supply hole 2*p*. The first supply flow passage connection section 2*q* is connected to the first introduction port 2*d* of each circulation path 2 and distributes the first fluid supplied to the first supply hole 2*p* to each first introduction port 2*d*.

The second supply flow passage 2*k* includes a second supply hole 2*r* that is connected to a second supply side connector 10*b* to be described later and a second supply flow passage connection section 2*s* that is connected to the second introduction port 2*e* of each circulation path 2. The configurations of the second supply hole 2*r* and the second supply flow passage connection section 2*s* of the second supply flow passage 2*k* are the same as those of the first supply hole 2*p* and the first supply flow passage connection section 2*q* of the first supply flow passage 2*j*.

The collection flow passage 2*o* includes a collection hole 2*t* and a collection flow passage connection section 2*u*. The collection hole 2*t* is opened at the one end surface of the flow passage structure 1 in the thickness direction and extends from the opening toward the other end surface of the flow passage structure 1 in the thickness direction so as to reach a position corresponding to the circulation path 2 closest to the other end surface among the plural circulation paths 2. The collection hole 2*t* is connected to a collection side connector 8*b* to be described later. The collection flow passage connection section 2*u* extends from a position corresponding to the circulation path 2 closest to the one end surface of the flow passage structure 1 in the thickness direction among the plural circulation paths 2 to a position corresponding to the circulation path 2 closest to the other end surface in the thickness direction of the flow passage structure 1. The collection flow passage connection section 2*u* communicates with the collection hole 2*t*. The collection flow passage connection section 2*u* is connected to the derivation port 2*i* of each circulation path 2, and merges the fluids derived from the respective derivation ports 2*i*. The fluids that are merged in the collection flow passage connection section 2*u* flow to the collection hole 2*t* and are derived through the collection side connector 8*b*.

Figure 4:
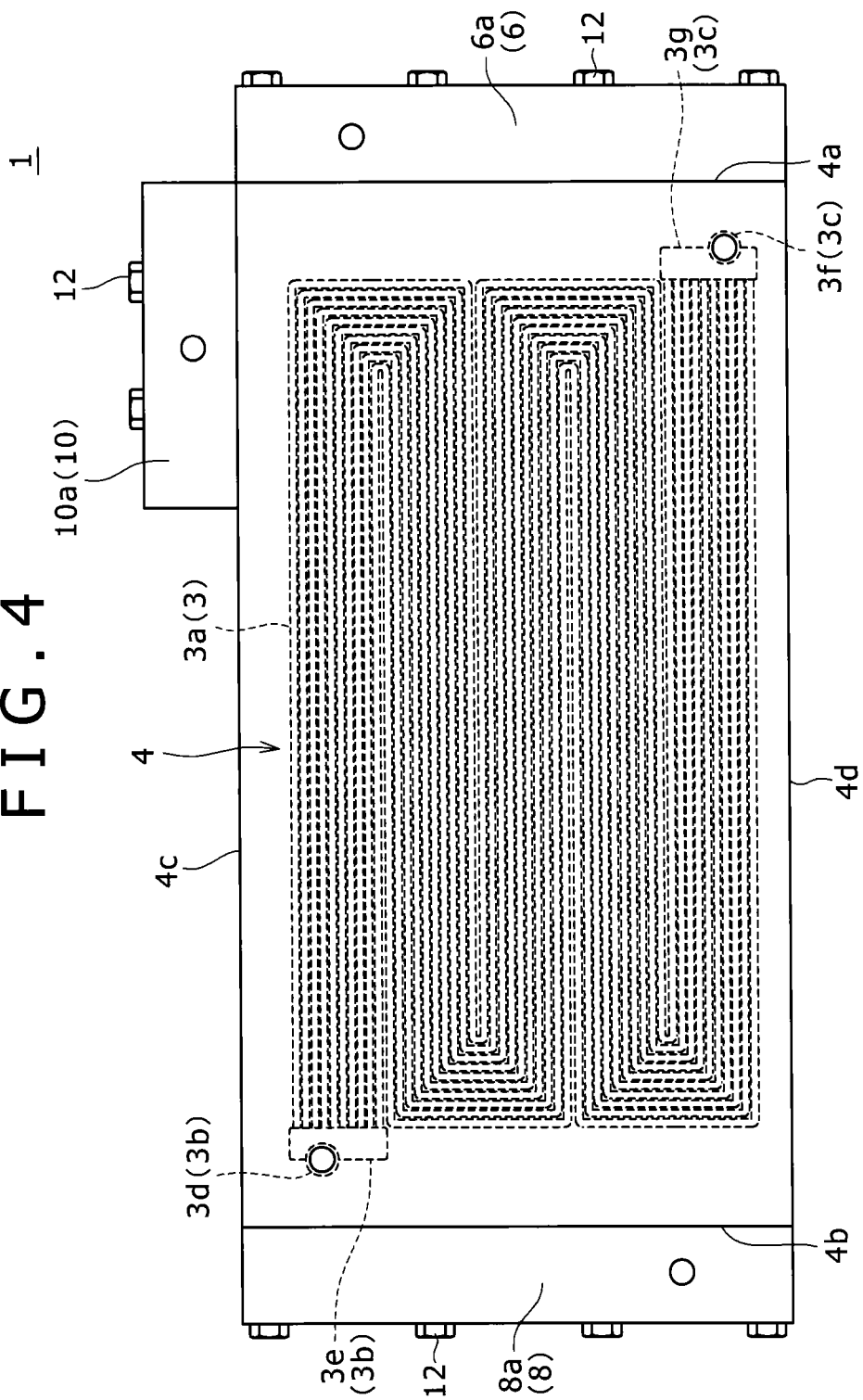
FIG. 4 is a diagram illustrating the arrangement of a temperature control flow passage of the flow passage structure illustrated in FIG. 1.
Figure 5:
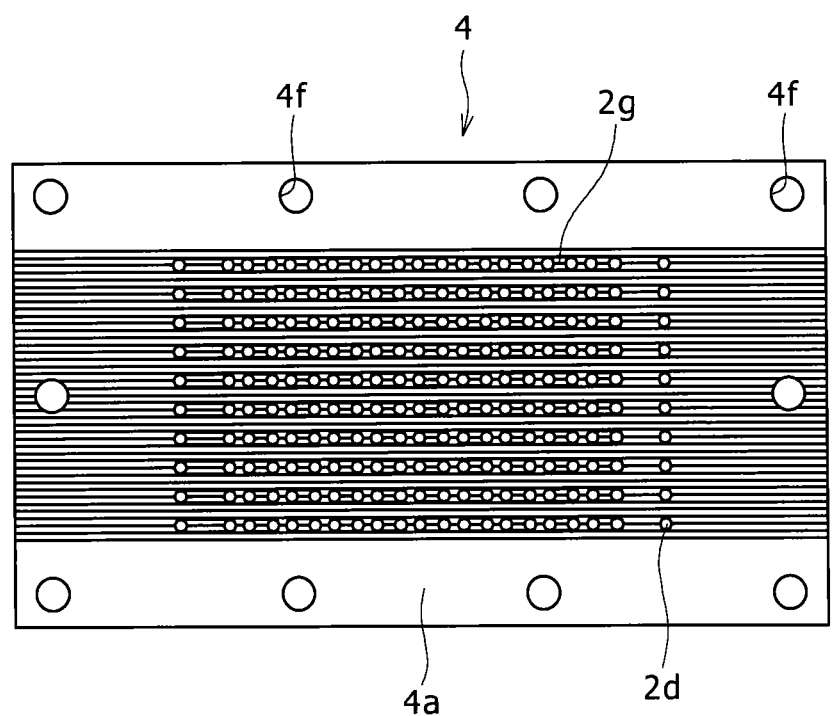
FIG. 5 is a diagram illustrating a first end surface of a body section of the flow passage structure according to the embodiment of the present invention.
Figure 6:
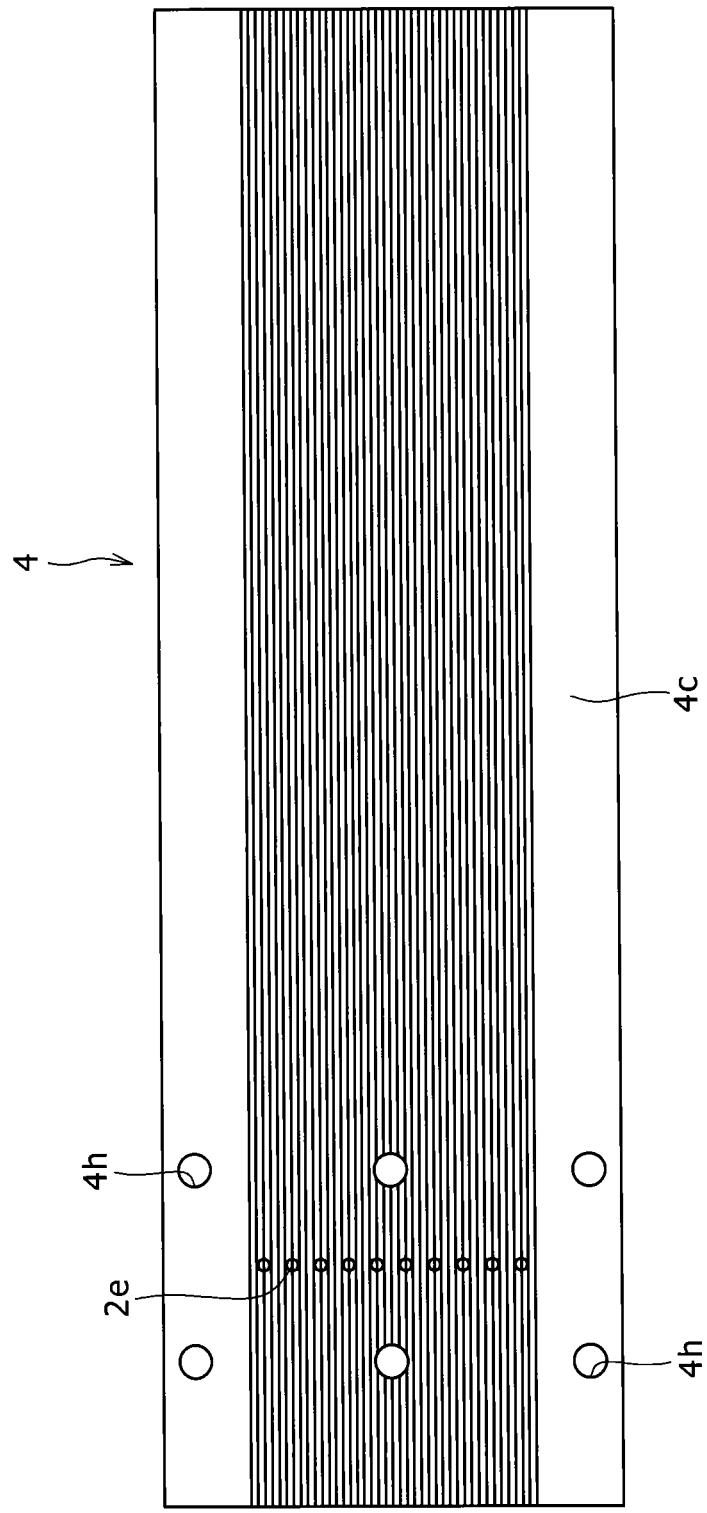
FIG. 6 is a diagram illustrating a third end surface of the body section of the flow passage structure according to the embodiment of the present invention.
Figure 7:
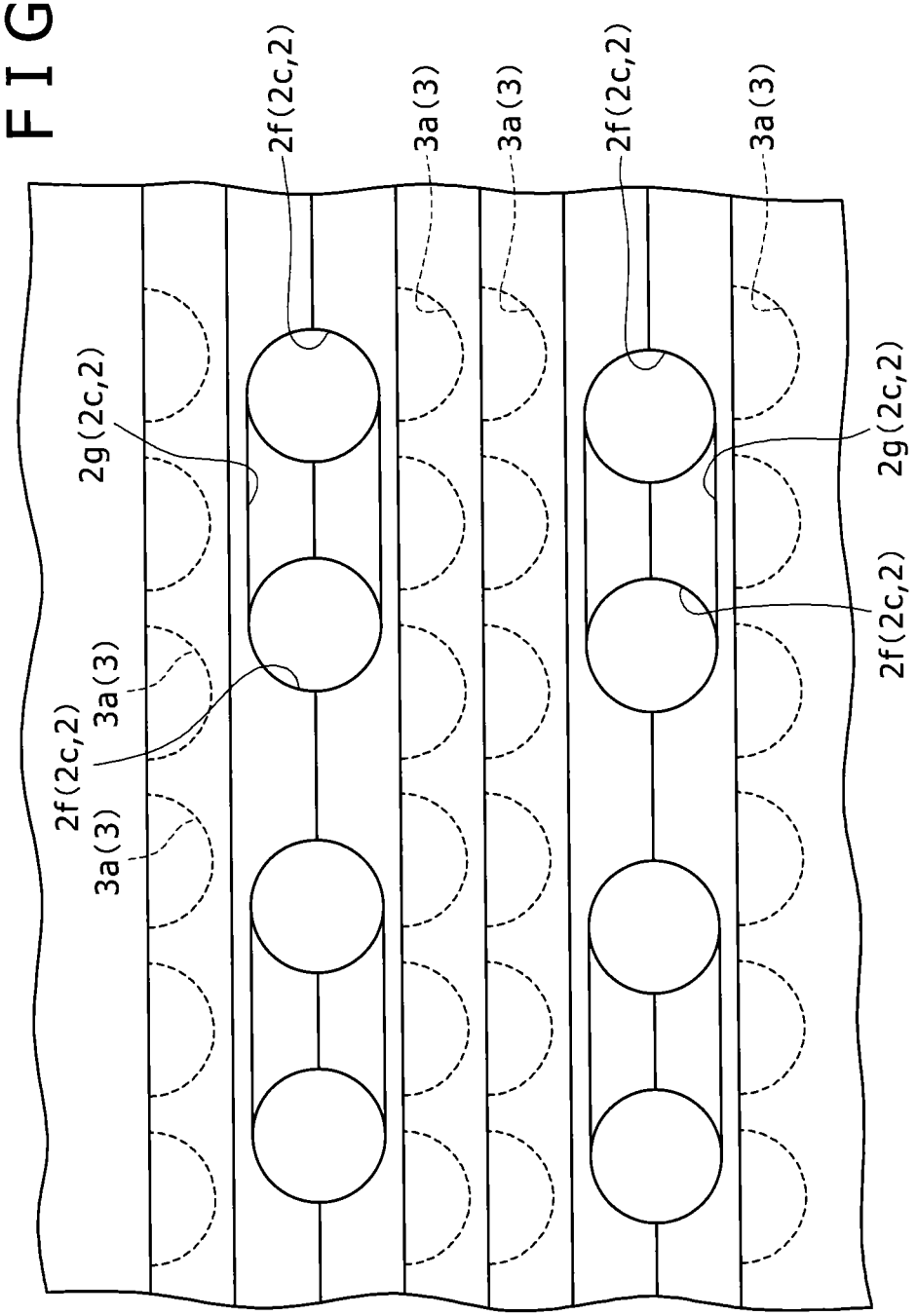
FIG. 7 is a partially enlarged view of the first end surface of the body section illustrated in FIG. 5 and illustrates a plate lamination structure and an opening of a first return bend formed in the first end surface.
Figure 8:
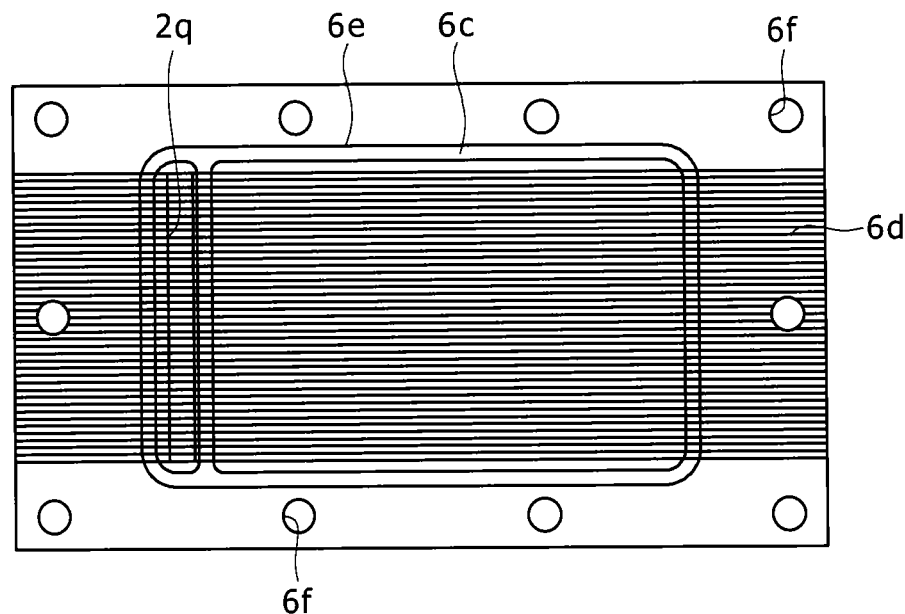
FIG. 8 is a diagram illustrating a first facing surface of a first lid section of the flow passage structure according to the embodiment of the present invention.
Figure 9:
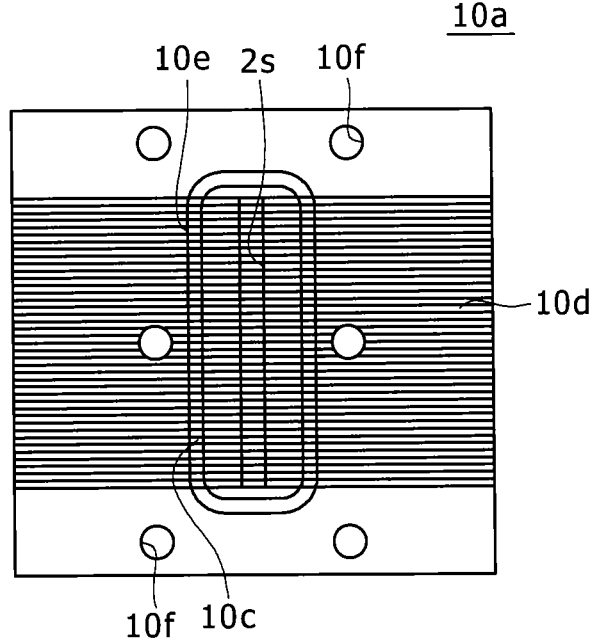
FIG. 9 is a diagram illustrating a third facing surface of a third lid section of the flow passage structure according to the embodiment of the present invention.

As illustrated in FIG. 4, each temperature control flow passage 3 includes plural unit flow passages 3*a* that are disposed in parallel. Each unit flow passage 3*a* has a tortuous shape which is formed by alternately connecting a portion that extends from the one end of the flow passage structure 1 in the longitudinal direction toward the opposite side and a portion that is folded back and extends toward the opposite side to the one end. Further, the flow passage structure 1 is provided with a temperature control supply flow passage 3*b* that distributes and supplies the temperature control fluid to each temperature control flow passage 3 and a temperature control collection flow passage 3*c* that collects the temperature control fluid from each temperature control flow passage 3.

The temperature control supply flow passage 3*b* includes a temperature control supply hole 3*d* and plural temperature control supply flow passage connection sections 3*e*. The temperature control supply hole 3*d* is opened at one end surface of the flow passage structure 1 in the thickness direction and extends from the opening toward the other end surface of the flow passage structure 1 in the thickness direction so as to reach a position corresponding to the temperature control flow passage 3 closest to the other end surface among plural temperature control flow passages 3. The temperature control supply hole 3*d* is connected to a temperature control supply side connector 16 to be described later. The temperature control fluid is supplied to the temperature control supply hole 3*d* through the temperature control supply side connector 16. Each temperature control supply flow passage connection section 3*e* is provided at the position corresponding to each temperature control flow passage 3 in the thickness direction of the flow passage structure 1. The temperature control supply flow passage connection section 3*e* connects the temperature control supply hole 3*d* to the upstream ends of the plural unit flow passages 3*a* of each temperature control flow passage 3. The temperature control fluid that is supplied to the temperature control supply hole 3*d* is distributed to the plural unit flow passages 3*a* of each temperature control flow passage 3 through each temperature control supply flow passage connection section 3*e*.

Further, the temperature control collection flow passage 3*c* includes a temperature control collection hole 3*f* and plural temperature control collection flow passage connection sections 3*g* that are connected to the downstream ends of the plural temperature control flow passages 3. The structures of the temperature control collection hole 3*f* and the temperature control collection flow passage connection sections 3*g* are the same as those of the temperature control supply hole 3*d* and the temperature control supply flow passage connection sections 3*e*. The temperature control collection hole 3*f* is connected to a temperature control collection side connector 18 to be described later. The temperature control fluids that are derived from the downstream ends of the plural unit flow passages 3*a* of each temperature control flow passage 3 are derived through the temperature control collection side connector 18 while passing through each temperature control collection flow passage connection section 3*g* and the temperature control collection hole 3*f*.

Then, the flow passage structure 1 of this embodiment provided with the circulation path 2 and the temperature control flow passage 3, as described above, includes a body section 4, a first header 6, a second header 8, a third header 10, and plural bolts 12.

The body section 4 occupies most of the flow passage structure 1. The body section 4 includes therein most of the plural circulation paths 2, the plural temperature control flow passages 3, the temperature control supply flow passage 3*b*, and the temperature control collection flow passage 3*c*. The body section 4 is formed in a rectangular parallelepiped shape. The body section 4 includes a first end surface 4*a* that is an end surface facing one side in the longitudinal direction and a second end surface 4*b* that faces the opposite side of the first end surface 4*a*. Further, the body section 4 includes a third end surface 4*c* that is an end surface facing one side in the lateral direction perpendicular to the longitudinal direction of the body section 4 and a fourth end surface 4*d* that is an end surface opposite to the third end surface 4*c*. The longitudinal direction of the body section 4 is the same direction as the longitudinal direction of the flow passage structure 1, the lateral direction of the body section 4 is the same direction as the lateral direction of the flow passage structure 1, and the thickness direction of the body section 4 is the same direction as the thickness direction of the flow passage structure 1. Further, the first end surface 4*a* is an end surface that is located at the one end of the flow passage structure 1 in the longitudinal direction of the body section 4, and the second end surface 4*b* is an end surface that is located at the opposite side to the one end of the flow passage structure 1 in the longitudinal direction of the body section 4.

The plural straight flow passages 2*f* of the merged fluid flow passage 2*c* of each circulation path 2 are provided inside the body section 4. Specifically, each straight flow passage 2*f* extends straightly between the first end surface 4*a* and the second end surface 4*b* of the body section 4 in a direction connecting both end surfaces 4*a* and 4*b* (a direction perpendicular to the first end surface 4*a* and the second end surface 4*b*). Further, the plural straight flow passages 2*f* are disposed in parallel in a direction perpendicular to the extension direction thereof. In other words, the plural straight flow passages 2*f* are disposed in parallel with a gap therebetween in a direction (a direction perpendicular to the third end surface 4*c* and the fourth end surface 4*d*) that connects the third end surface 4*c* and the fourth end surface 4*d* of the body section 4. The respective straight flow passages 2*f* have the same length. The length of each straight flow passage 2*f* is a length slightly smaller than the distance between the first end surface 4*a* and the second end surface 4*b* of the body section 4.

Each first return bend 2*g* of the merged fluid flow passage 2*c* of each circulation path 2 connects the downstream end of the straight flow passage 2*f* through which the fluid flows from the second end surface 4*b* toward the first end surface 4*a* among the plural straight flow passages 2*f* to the upstream end of the straight flow passage 2*f* that is disposed at the downstream side of the straight flow passage 2*f* and is adjacent to the straight flow passage 2*f*. Each first return bend 2*g* is opened at the first end surface 4*a* of the body section 4. Further, each second return bend 2*h* of the merged fluid flow passage 2*c* of each circulation path 2 connects the downstream end of the straight flow passage 2*f* through which the fluid flows from the first end surface 4*a* toward the second end surface 4*b* among the plural straight flow passages 2*f* to the upstream end of the straight flow passage 2*f* that is disposed at the downstream side of the straight flow passage 2*f* and is adjacent to the straight flow passage 2*f*. Each second return bend 2*h* is opened at the second end surface 4*b* of the body section 4. When viewed toward the first end surface 4*a* of the body section 4, the space inside the straight flow passage 2*f* connected to each first return bend 2*g* is viewed to the second end surface 4*b* through the opening of each first return bend 2*g*. When viewed toward the second end surface 4*b* of the body section 4, the space inside the straight flow passage 2*f* connected to each second return bend 2*h* is viewed to the first end surface 4*a* through the opening of each second return bend 2*h*.

Further, the first introduction path 2*a* and the second introduction path 2*b* of each circulation path 2 are also provided inside the body section 4. The first introduction port 2*d* of the first introduction path 2*a* is opened at a position close to the third end surface 4*c* in the first end surface 4*a* of the body section 4. The first introduction path 2*a* extends straightly inside the body section 4 from the first introduction port 2*d* toward the second end surface 4*b* of the body section 4 and is connected to the upstream end of the merged fluid flow passage 2*c*. The first introduction path 2*a* is disposed on the same straight line as that of the straight flow passage 2*f* that is located at the most upstream side in the merged fluid flow passage 2*c* connected to the first introduction path 2*a*. The second introduction port 2*e* of the second introduction path 2*b* is opened at a position close to the first end surface 4*a* in the third end surface 4*c* of the body section 4. The second introduction path 2*b* extends straightly inside the body section 4 from the second introduction port 2*e* toward the fourth end surface 4*d* of the body section 4 and is connected to the upstream end of the merged fluid flow passage 2*c*. The second introduction path 2*b* extends in a direction perpendicular to the straight flow passage 2*f* of the merged fluid flow passage 2*c* connected to the second introduction path 2*b*.

Further, the first end surface 4*a* of the body section 4 is provided with plural first bolt holes 4*f* (see FIG. 5) that surround an area provided with the openings of all the first return bends 2*g* and all the first introduction ports 2*d*. The second end surface 4*b* of the body section 4 is provided with plural second bolt holes 4*g* (see FIG. 1) that surround an area provided with the openings of all the second return bends 2*h* and all the derivation ports 2*i*. Further, the third end surface 4*c* of the body section 4 is provided with plural third bolt holes 4*h* that surround an area provided with all the second introduction ports 2*e*.

The temperature control flow passages 3 are disposed with a gap therebetween at one side or the other side of the body section 4 in the thickness direction with respect to the respective circulation paths 2 inside the body section 4. The temperature control supply flow passage 3*b* is provided at the position near the second end surface 4*b* and the third end surface 4*c* of the body section 4. Further, the temperature control collection flow passage 3*c* is provided at the position near the first end surface 4*a* and the fourth end surface 4*d* of the body section 4. Further, the temperature control supply side connector 16 is attached to one surface of the body section 4 in the thickness direction so as to be connected to the temperature control supply hole 3*d* of the temperature control supply flow passage 3*b*, and the temperature control collection side connector 18 is attached thereto so as to be connected to the temperature control collection hole 3*f* of the temperature control collection flow passage 3*c*. The temperature control supply side connector 16 is connected to a connector of a temperature control supply pipe (not illustrated) for supplying the temperature control fluid, and the temperature control collection side connector 18 is connected to a connector of a temperature control collection pipe (not illustrated) for collecting the temperature control fluid.

Further, the body section 4 is formed by a member in which plural substrates are laminated and are bonded to one another. Each circulation path 2 is formed in a manner such that a groove formed in the front surface of the substrate so as to have a shape corresponding to the circulation path 2 overlap a groove formed in the rear surface of the other substrate laminated on the substrate so as to be symmetrical to the groove. Further, each temperature control flow passage 3 is formed in a manner such that a groove formed in the front surface of the substrate so as to have a shape corresponding to the temperature control flow passage 3 is sealed by the other substrate laminated on the substrate.

The first header 6 is disposed so as to face the first end surface 4*a* of the body section 4, and is coupled to the body section 4 in a removable manner. Further, the first header 6 is coupled to the body section 4 while contacting the first end surface 4*a* so as to seal the openings of all the first return bends 2*g* formed in the first end surface 4*a*. The first header 6 is included in the concept of a first lid section of the present invention. The first header 6 includes a first header body 6*a*, the first supply side connector 6*b*, and a first outer peripheral sealing member 6*c*.

The first header body 6*a* is coupled to the body section 4 in a removable manner. The first header body 6*a* includes a first facing surface 6*d* (see FIG. 8) that faces and contacts the first end surface 4*a* of the body section 4 while the first header body 6*a* is coupled to the body section 4. When the first facing surface 6*d* contacts the first end surface 4*a*, the opening of the first return bend 2*g* formed in the first end surface 4*a* is sealed. The first facing surface 6*d* has the same external shape as that of the first end surface 4*a* of the body section 4. Further, the first header body 6*a* is provided with the first supply flow passage 2*j*. The first supply flow passage connection section 2*q* of the first supply flow passage 2*j* is opened at the position where the first supply flow passage connection section is connected to the first introduction port 2*d* of each circulation path 2 while the first header body 6*a* is coupled to the body section 4 in the first facing surface 6*d* of the first header body 6*a*. Further, the first facing surface 6*d* is provided with a first sealing member attachment groove 6*e* that surrounds the entire outer periphery of the openings of all the first return bends 2*g* and the entire outer periphery of all the first introduction ports 2*d* (the outer periphery of the first supply flow passage connection section 2*q*) while the first header body 6*a* is coupled to the body section 4. The first outer peripheral sealing member 6*c* is fitted to a first sealing member attachment groove 6*e*. The first outer peripheral sealing member 6*c* is formed by a gasket. When the first header body 6*a* is coupled to the body section 4 so that the first facing surface 6*d* of the first header body 6*a* closely contacts the first end surface 4*a* of the body section 4, the entire outer periphery of the openings of all the first return bends 2*g* are sealed and the entire outer periphery of the first supply flow passage connection section 2*q* and all the first introduction ports 2*d* are sealed, thereby preventing the fluid from leaking between the first end surface 4*a* of the body section 4 and the first facing surface 6*d* of the first header body 6*a*.

Further, plural first bolt insertion holes 6*f* are provided in the first header body 6*a* so as to surround the outside of the first sealing member attachment groove 6*e*. The plural first bolt insertion holes 6*f* penetrate the first header body 6*a* from the first facing surface 6*d* of the first header body 6*a* toward the opposite surface to the first facing surface 6*d*. The plural first bolt insertion holes 6*f* are provided at the position where the plural first bolt insertion holes match the plural first bolt holes 4*f* formed in the first end surface 4*a* of the body section 4 while the first header body 6*a* is coupled to the body section 4. The first header body 6*a* is fastened to the body section 4 in a manner such that a bolt 12 is inserted through each first bolt insertion hole 6*f* and the bolt 12 is screw-connected to the corresponding first bolt hole 4*f* of the body section 4. Further, when the bolt 12 is released and separated, the first header body 6*a* may be separated from the body section 4.

The first supply side connector 6*b* is attached to one surface of the first header body 6*a* in the thickness direction so as to be connected to the first supply hole 2*p* of the first supply flow passage 2*j*. The first supply side connector 6*b* is connected to a connector of a supply pipe (not illustrated) for supplying the first fluid, and introduces the first fluid supplied from the supply pipe into the first supply hole 2*p*.

The second header 8 is disposed so as to face the second end surface 4*b* of the body section 4, and is coupled to the body section 4 in a removable manner. Further, the second header 8 is coupled to the body section 4 while contacting the second end surface 4*b* so as to seal the openings of all the second return bends 2*h* formed on the second end surface 4*b*. The second header 8 is included in the concept of the second lid section of the present invention. The second header 8 includes a second header body 8*a*, the collection side connector 8*b*, and a second outer peripheral sealing member (not illustrated).

The second header body 8*a* is coupled to the body section 4 in a removable manner. The second header body 8*a* includes a second facing surface (not illustrated) that faces and contacts the second end surface 4*b* of the body section 4 while the second header body 8*a* is coupled to the body section 4. When the second facing surface contacts the second end surface 4*b*, the opening of the second return bend 2*h* formed in the second end surface 4*b* is sealed. The second facing surface has the same external shape as that of the second end surface 4*b* of the body section 4. Further, the second header body 8*a* is provided with the collection flow passage 2*o*. The collection flow passage connection section 2*u* of the collection flow passage 2*o* is opened at the position where the collection flow passage connection section is connected to the derivation port 2*i* of each circulation path 2 while the second header body 8*a* is connected to the body section 4 in the second facing surface of the second header body 8*a*. Further, the second facing surface is provided with a second sealing member attachment groove (not illustrated) that surrounds the entire outer periphery of the openings of all the second return bends 2*h* and the entire outer periphery of all the derivation ports 2*i* (the outer periphery of the collection flow passage connection section 2*u*) while the second header body 8*a* is coupled to the body section 4. The second outer peripheral sealing member (not illustrated) is fitted to the second sealing member attachment groove. The second outer peripheral sealing member, the second sealing member attachment groove, and the opening of the collection flow passage connection section 2*u* of the second facing surface of the second header body 8*a* have the same configurations as those of the first outer peripheral sealing member 6*c*, the first sealing member attachment groove 6*e*, and the opening of the first supply flow passage connection section 2*q* of the first facing surface 6*d* of the first header body 6*a* except that these members are disposed so as to be symmetrical to one another.

Further, the second header body 8*a* is provided with plural second bolt insertion holes 8*f* that are the same as the plural first bolt insertion holes 6*f* formed in the first header body 6*a*. The second header body 8*a* is fastened to the body section 4 in a manner such that the bolt 12 is inserted through each second bolt insertion hole 8*f* and the bolt 12 is screw-connected to the corresponding second bolt hole 4*g* of the body section 4.

The collection side connector 8*b* is attached to one end surface of the second header body 8*a* in the thickness direction so as to be connected to the collection hole 2*t* of the collection flow passage 2*o*. The collection side connector 8*b* is connected to a connector of a collection pipe (not illustrated) for collecting the fluid, and causes the fluid derived from the collection hole 2*t* to flow into the collection pipe.

The third header 10 is disposed so as to face the third end surface 4*c* of the body section 4, and is coupled to the body section 4 in a removable manner. The third header 10 includes a third header body 10*a*, a second supply side connector 10*b*, and a third outer peripheral sealing member 10*c* (see FIG. 9).

The third header body 10*a* is coupled to the body section 4 in a removable manner. The third header body 10*a* includes a third facing surface 10*d* that faces and contacts the third end surface 4*c* of the body section 4 while the third header body 10*a* is coupled to the body section 4. Further, the third header body 10*a* is provided with the second supply flow passage 2*k*. The second supply flow passage connection section 2*s* of the second supply flow passage 2*k* is opened at the position where the second supply flow passage connection section is connected to the second introduction port 2*e* of each circulation path 2 while the third header body 10*a* is coupled to the body section 4 in the third facing surface 10*d* of the third header body 10*a*. Further, the third facing surface 10*d* is provided with a third sealing member attachment groove 10*e* that surrounds the outer periphery of the second supply flow passage connection section 2*s*. The third outer peripheral sealing member 10*c* is fitted to the third sealing member attachment groove 10*e*. The third outer peripheral sealing member 10*c* is formed by a gasket. When the third header body 10*a* is coupled to the body section 4 so that the third facing surface 10*d* of the third header body 10*a* closely contacts the third end surface 4*c* of the body section 4, the periphery of the second supply flow passage connection section 2*s* and the plural second introduction ports 2*e* is sealed, thereby preventing the fluid from leaking between the third end surface 4*c* of the body section 4 and the third facing surface 10*d* of the third header body 10*a*.

Further, plural third bolt insertion holes 10*f* are provided in the third header body 10*a* so as to surround the outside of the third sealing member attachment groove 10*e*. The plural third bolt insertion holes 10*f* penetrate the third header body 10*a* from the third facing surface 10*d* of the third header body 10*a* toward the opposite surface to the third facing surface 10*d*. The plural third bolt insertion holes 10*f* are provided at the position where the plural third bolt insertion holes match the plural third bolt holes 4*h* formed in the third facing surface 10*d* of the body section 4 while the third header body 10*a* is coupled to the body section 4. The third header body 10*a* is fastened to the body section 4 in a manner such that the bolt 12 is inserted through each third bolt insertion hole 10*f* and the bolt 12 is screw-connected to the corresponding third bolt hole 4*h* of the body section 4.

The second supply side connector 10*b* is attached to one surface of the third header body 10*a* in the thickness direction so as to be connected to the second supply hole 2*r* of the second supply flow passage 2*k*. The second supply side connector 10*b* is connected to a connector of a supply pipe (not illustrated) for supplying the second fluid, and introduces the second fluid supplied from the supply pipe into the second supply hole 2*r*.

Next, a method of manufacturing the flow passage structure 1 according to this embodiment will be described.

In the method of manufacturing the flow passage structure 1 according to this embodiment, a rectangular parallelepiped base member 20 (see FIG. 10) is formed and the base member 20 is cut so as to form the body section 4, the first header body 6*a* of the first header 6, the second header body 8*a* of the second header 8, and the third header body 10*a* of the third header 10.

Specifically, first, plural substrates made of metal such as stainless steel are laminated and bonded so as to form the base member 20. Here, the plural substrates include an upper end plate 22, a lower end plate 23, plural first circulation path plates 24, plural second circulation path plates 26, and plural temperature control plates 28 (see FIG. 11).

In a step of forming the base member 20, first, a first circulation path groove 32*a* (see FIG. 12) having a shape corresponding to the shape of the circulation path 2 is formed in the front surface of each first circulation path plate 24 by an etching process. Further, in each first circulation path plate 24, a first supply penetration hole 34*a* that has a shape corresponding to the first supply flow passage 2*j* is formed at the position corresponding to the first supply flow passage 2*j*, a second supply penetration hole 36*a* that has a shape corresponding to the second supply flow passage 2*k* is formed at the position corresponding to the second supply flow passage 2*k*, and a collection penetration hole 38*a* that has a shape corresponding to the collection flow passage 2*o* is formed at the position corresponding to the collection flow passage 2*o*. Further, in each first circulation path plate 24, a temperature control supply penetration hole 40*a* that has a shape corresponding to the temperature control supply hole 3*d* is formed at the position corresponding to the temperature control supply hole 3*d* of the temperature control supply flow passage 3*b*, and a temperature control collection penetration hole 42*b* that has a shape corresponding to the temperature control collection hole 3*f* is formed at the position corresponding to the temperature control collection hole 3*f* of the temperature control collection flow passage 3*c*.

Further, a second circulation path groove 32b (see FIG. 13) that corresponds to the shape of the circulation path 2 and is symmetrical to the first circulation path groove 32a is formed in the rear surface of the second circulation path plate 26 by an etching process. Further, each second circulation path plate 26 forms a first supply penetration hole 34b, a second supply penetration hole 36b, a collection penetration hole 38b, a temperature control supply penetration hole 40b, and the temperature control collection penetration hole 42b at the positions matching the first supply penetration hole 34a, the second supply penetration hole 36a, the collection penetration hole 38a, the temperature control supply penetration hole 40a, and a temperature control collection penetration hole 42a of the first circulation path plate 24 when the rear surface of the second circulation path plate 26 overlaps the front surface of the first circulation path plate 24. The first supply penetration hole 34b is formed in the same shape as that of the first supply penetration hole 34a of the first circulation path plate 24, the second supply penetration hole 36b is formed in the same shape as that of the second supply penetration hole 36a of the first circulation path plate 24, and the collection penetration hole 38b is formed in the same shape as that of the collection penetration hole 38a of the first circulation path plate 24. Further, the temperature control supply penetration hole 40b is formed in the same shape as that of the temperature control supply penetration hole 40a of the first circulation path plate 24, and the temperature control collection penetration hole 42b is formed in the same shape as that of the temperature control collection penetration hole 42a of the first circulation path plate 24.

Figure 14:
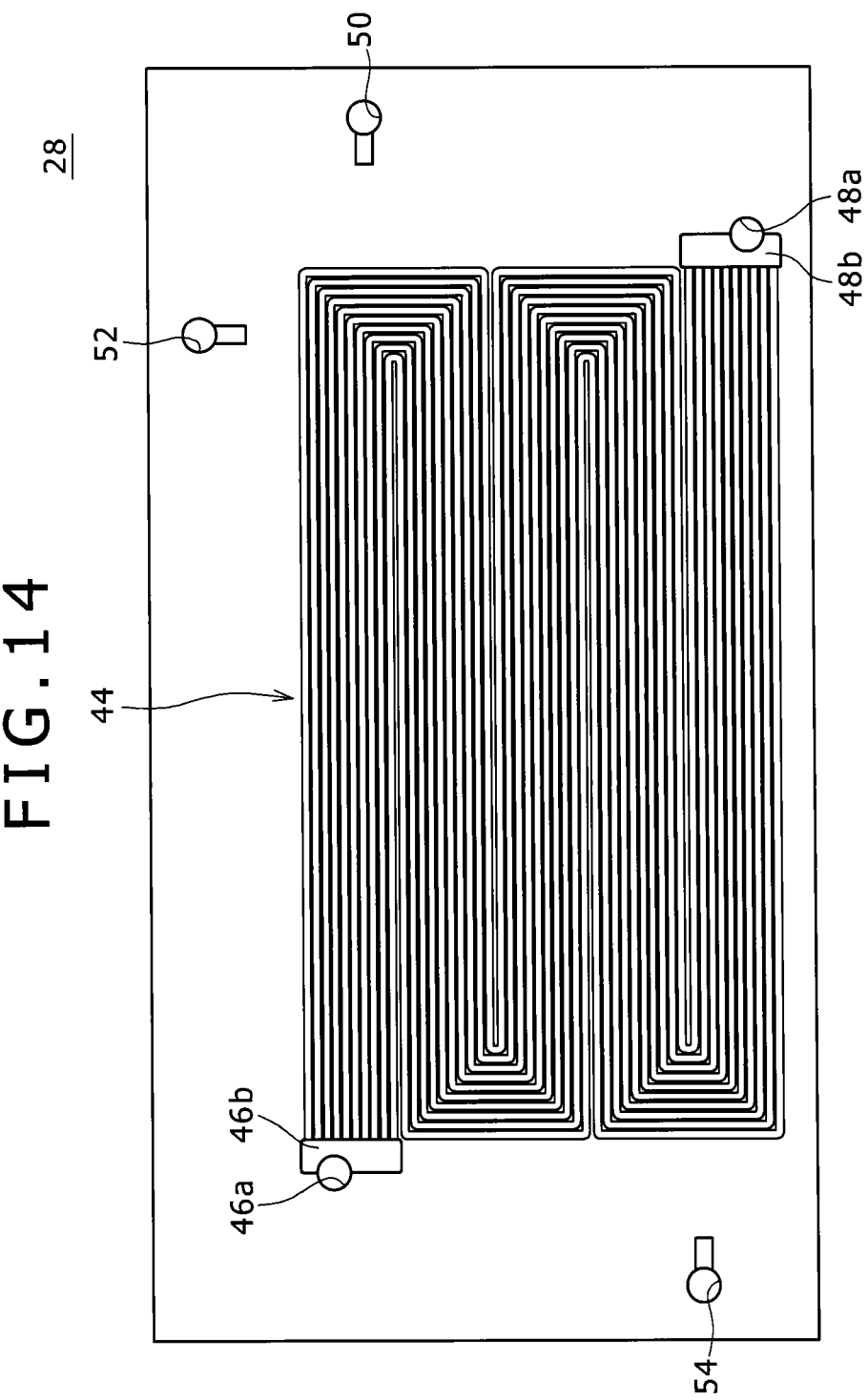
FIG. 14 is a top view illustrating a front surface of a temperature control plate that forms the base member.

Further, a temperature control flow passage groove 44 that has a shape corresponding to the shape of the temperature control flow passage 3 is formed in the front surface of each temperature control plate 28 by an etching process (see FIG. 14). Further, in each temperature control plate 28, a temperature control supply penetration hole 46a is formed at the position corresponding to the temperature control supply hole 3d, and a temperature control supply groove 46b that has a shape corresponding to the temperature control supply flow passage connection section 3e is formed at the position corresponding to the temperature control supply flow passage connection section 3e. Further, in each temperature control plate 28, a temperature control collection penetration hole 48a is formed at the position corresponding to the temperature control collection hole 3f, and a temperature control collection groove 48b that has a shape corresponding to the temperature control collection flow passage connection section 3g is formed at the position corresponding to the temperature control collection flow passage connection section 3g. Further, in each temperature control plate 28, a first supply penetration hole 50 is formed at the position corresponding to the first supply penetration hole 34a of the first circulation path plate 24 with the same shape thereof, a second supply penetration hole 52 is formed at the position corresponding to the second supply penetration hole 36a of the first circulation path plate 24 with the same shape thereof, and a collection penetration hole 54 is formed at the position corresponding to the collection penetration hole 38a of the first circulation path plate 24 with the same shape thereof.

Further, in the upper end plate 22, a first supply penetration hole 56, a second supply penetration hole 58, a collection penetration hole 60, a temperature control supply penetration hole 62, and a temperature control collection penetration hole 64 are formed at the positions corresponding to the first supply penetration hole, the second supply penetration hole, the collection penetration hole, the temperature control supply penetration hole, and the temperature control collection penetration hole of each plate with the same shape thereof, respectively.

Next, one temperature control plate 28, the first circulation path plate 24, the second circulation path plate 26, and the temperature control plate 28 are laminated in this order from the downside. Specifically, these plates are laminated so that the rear surface of the first circulation path plate 24 overlaps the front surface of the temperature control plate 28, the rear surface of the second circulation path plate 26 overlaps the front surface of the first circulation path plate 24, and the rear surface of another temperature control plate 28 overlaps the front surface of the second circulation path plate 26. At this time, these plates are laminated so that the positions of the first supply penetration holes, the second supply penetration holes, the collection penetration holes, the temperature control supply penetration holes, and the temperature control collection penetration holes of the respective plates match one another and the first circulation path groove 32a of the first circulation path plate 24 overlaps the second circulation path groove 32b of the second circulation path plate 26 without any deviation therebetween. Then, four plates are integrated with one another by diffusion-bonding the overlapping surfaces of the four laminated plates. Then, similarly, plural blocks each having the four integrated plates are formed. Then, the plural blocks are laminated, the upper end plate 22 is disposed at the uppermost side, the lower end plate 23 is disposed at the lowermost side, and the overlapping surfaces are diffusion-bonded to one another. Accordingly, the single base member 20 is formed, and the circulation path 2 is formed inside the base member 20 by the first circulation path groove 32a and the second circulation path groove 32b. Further, the temperature control flow passage groove 44 is sealed so that the temperature control flow passage 3 is formed inside the base member 20. Further, the first supply flow passage 2j is formed by the connection of the first supply penetration holes of the respective plates, the second supply flow passage 2k is formed by the connection of the second supply penetration holes of the respective plates, and the collection flow passage 2o is formed by the connection of the collection penetration holes of the respective plates. Further, the temperature control supply hole 3d is formed by the connection of the temperature control supply penetration holes of the respective plates, and the temperature control collection hole 3f is formed by the connection of the temperature control collection penetration holes of the respective plates.

Figure 10:
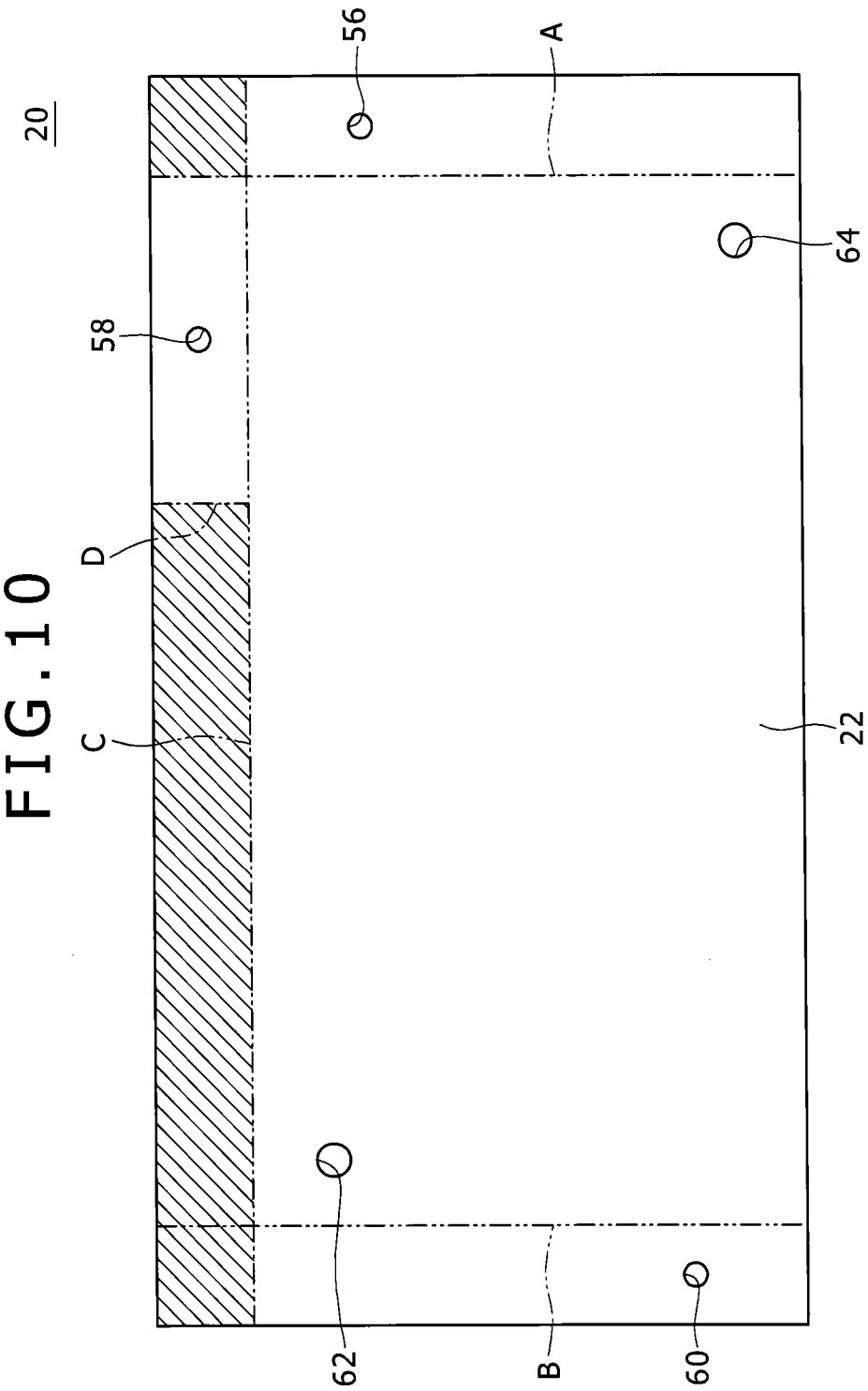
FIG. 10 is a top view of a base member that is used to form the flow passage structure.
Figure 11:
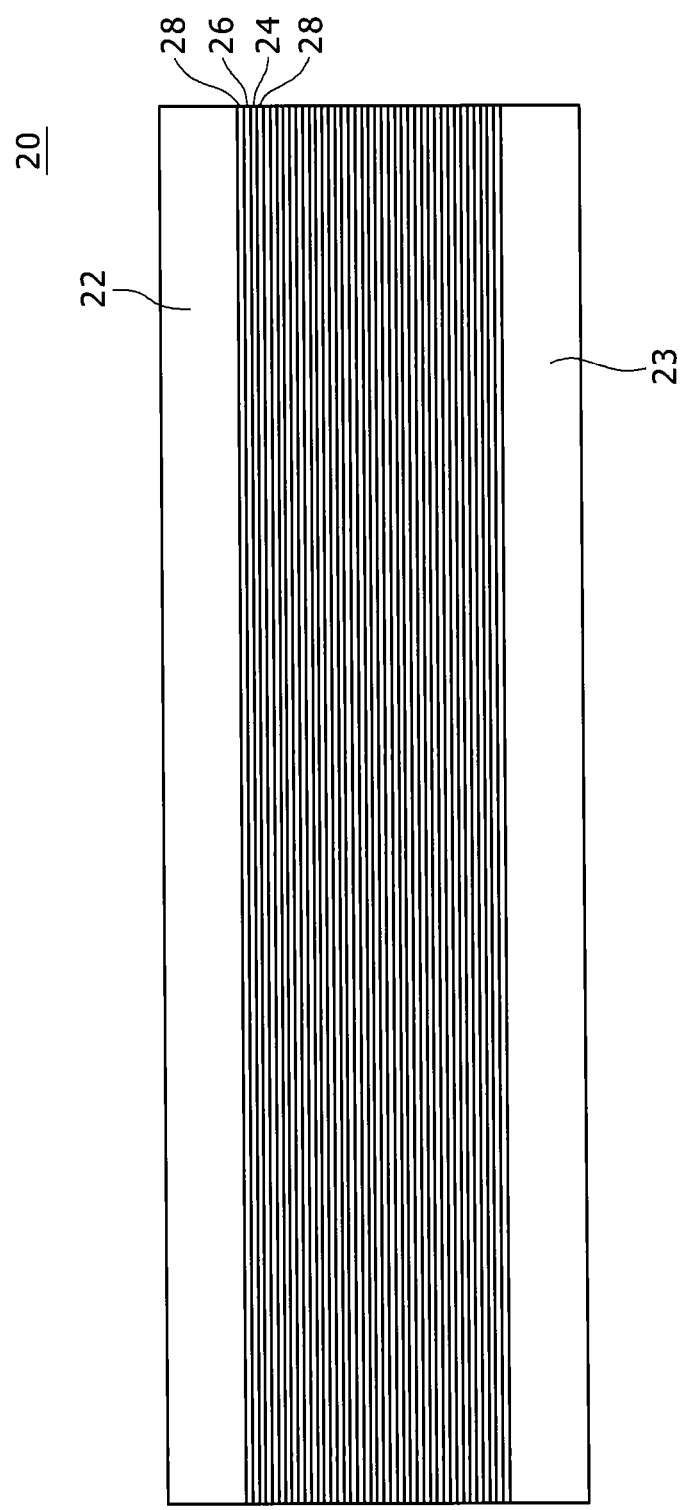
FIG. 11 is a side view of a main member that is formed by the base member.
Figure 12:
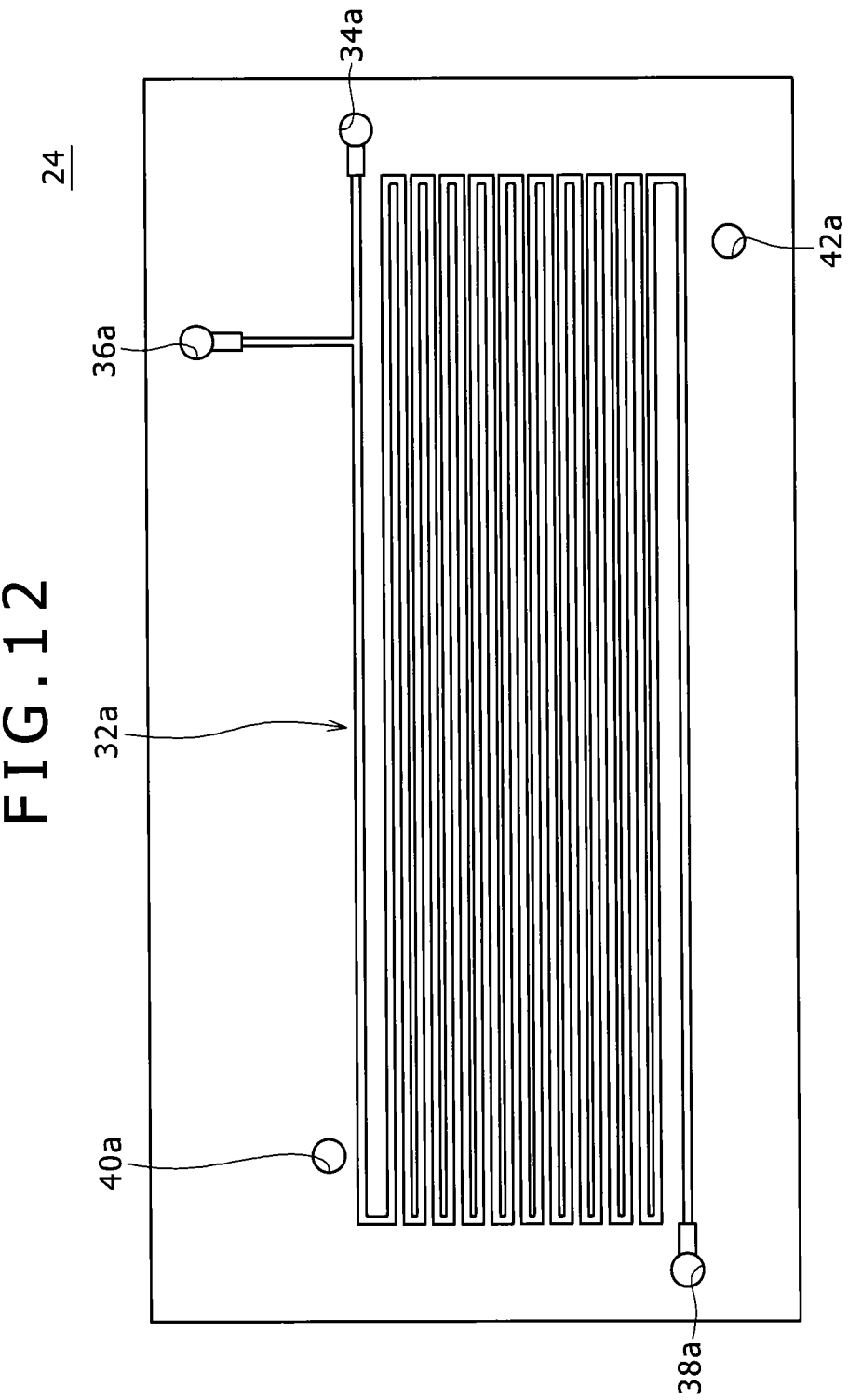
FIG. 12 is a top view illustrating a front surface of a first circulation path plate that forms the base member.
Figure 13:
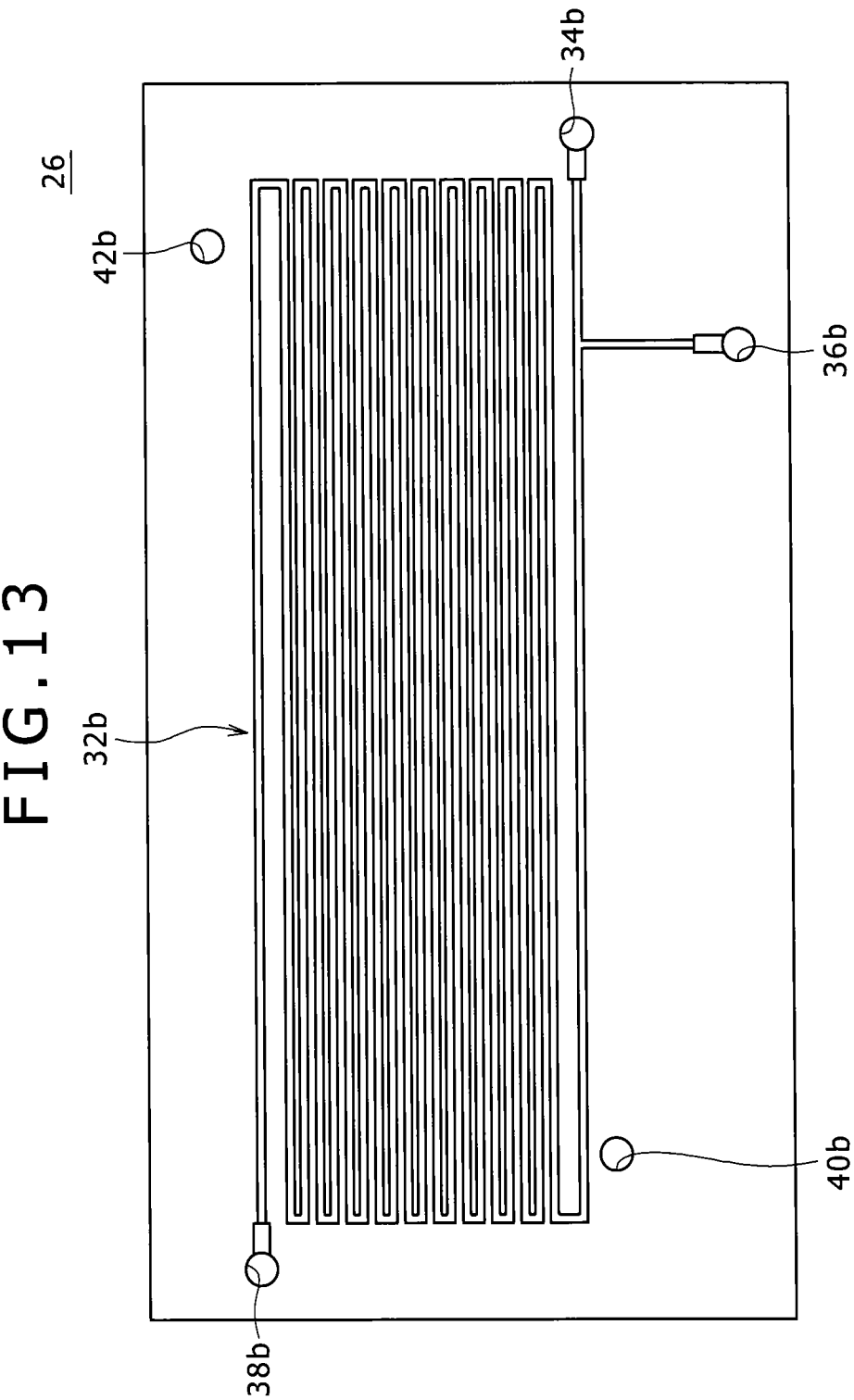
FIG. 13 is a top view illustrating a rear surface of a second circulation path plate that forms the base member.

Next, performed is a cutting step of cutting the base member 20 along a first cutting line A, a second cutting line B, a third cutting line C, and a fourth cutting line D illustrated in FIG. 10.

In this cutting step, the base member 20 is cut along the respective cutting lines A, B, C, and D by a wire discharge cutting process. Furthermore, the first cutting line A is a cutting line that extends in a direction perpendicular to the extension direction of the plural straight flow passages 2f of each circulation path 2 and passes through all the first return bends 2g, and the second cutting line B is a cutting line that extends in a direction perpendicular to the extension direction of the plural straight flow passages 2f of each circulation path 2 and passes through all the second return bends 2h. Further, the third cutting line C is a cutting line that is perpendicular to the first cutting line A and the second cutting line B and passes through the boundary between the second introduction port 2e of each circulation path 2 and the second supply flow passage connection section 2s connected to the second introduction port 2e. Further, the fourth cutting line D is a cutting line along which an end material generated by cutting the base member 20 along the third cutting line C is further cut and is a cutting line that extends in a direction perpendicular to the third cutting line C at the position opposite to the first supply flow passage 2j with respect to the second supply flow passage 2k.

By such a cutting step, a main member 20a is formed which is a portion obtained after cutting off the outer portion of the third cutting line C at the portion between the first cutting line A and the second cutting line B of the base member 20. Further, a first member (not illustrated) is formed by cutting the end material at the third cutting line C from the portion outside the first cutting line A in the base member 20, and a second member (not illustrated) is formed by cutting the end material at the third cutting line C from the outer portion of the second cutting line B in the base member 20. Further, a third member (not illustrated) is formed by the portion located at the outside of the third cutting line C of the base member 20 and located between the first cutting line A and the fourth cutting line D.

Then, the cutting surface along the first cutting line A of the main member 20a is provided with the opening of the first return bend 2g and the opening of the first introduction port 2d, and the cutting surface along the second cutting line B of the main member 20a is provided with the opening of the second return bend 2h and the opening of the derivation port 2i. Further, the cutting surface along the third cutting line C of the main member 20a is provided with the opening of the second introduction port 2e. Further, the cutting surface along the first cutting line A of the first member is provided with the opening of the first supply flow passage connection section 2q, and the cutting surface along the second cutting line B of the second member is provided with the opening of the collection flow passage connection section 2u. Further, the cutting surface along the third cutting line C of the third member is provided with the opening of the second supply flow passage connection section 2s.

Next, the body section 4 is formed by using the main member 20a that is formed as described above. Specifically, the plural first bolt holes 4f are formed in the cutting surface along the first cutting line A of the main member 20a. The cutting surface becomes the first end surface 4a of the body section 4. Further, the plural second bolt holes 4g are formed in the cutting surface along the second cutting line B of the main member 20a. The cutting surface becomes the second end surface 4b of the body section 4. Further, the plural third bolt holes 4h are formed in the cutting surface along the third cutting line C of the main member 20a. The cutting surface becomes the third end surface 4c of the body section 4. Then, the temperature control supply side connector 16 is attached so as to be connected to the temperature control supply penetration hole 62 of the upper end plate 22 in the main member 20a, and the temperature control collection side connector 18 is attached so as to be connected to the temperature control collection penetration hole 64 of the upper end plate 22 in the main member 20a. In this way, the body section 4 is formed.

Further, the first lid section 6 is formed by using the first member that is formed as described above. Specifically, the first sealing member attachment groove 6e is formed in the cutting surface along the first cutting line A of the first member. Further, the plural first bolt insertion holes 6f are formed in the first member so as to penetrate the first member from the cutting surface thereof to the opposite surface thereof. Then, the first outer peripheral sealing member 6c is fitted to the first sealing member attachment groove 6e. Further, the first supply side connector 6b is attached so as to be connected to the first supply penetration hole 56 of the upper end plate 22 in the first member. In this way, the first lid section 6 is formed.

Further, the second lid section 8 is formed by using the second member that is formed as described above. Specifically, the second sealing member attachment groove is formed in the cutting surface along the second cutting line B of the second member. Further, the plural second bolt insertion holes are formed in the second member so as to penetrate the second member from the cutting surface thereof toward the opposite surface thereof. Then, the second outer peripheral sealing member is fitted to the second outer peripheral sealing member attachment groove. Further, the collection side connector 8b is attached so as to be connected to the collection penetration hole 60 of the upper end plate 22 in the second member. In this way, the second lid section 8 is formed.

Further, the third lid section 10 is formed by using the third member that is formed as described above. Specifically, the third sealing member attachment groove 10e is formed in the cutting surface along the third cutting line B of the third member. Further, the plural third bolt insertion holes 10f are formed in the third member so as to penetrate the third member from the cutting surface thereof toward the opposite surface thereof. Then, the third outer peripheral sealing member 10c is fitted to the third sealing member attachment groove 10e. Further, the second supply side connector 10b is attached so as to be connected to the second supply penetration hole 58 of the upper end plate 22 in the third member. In this way, the third lid section 10 is formed.

Then, the flow passage structure 1 is formed by fastening the first lid section 6, the second lid section 8, and the third lid section 10 through the bolt 12 to the body section 4 that is formed as described above.

As described above, in this embodiment, each first return bend 2g that is connected to one end of each straight flow passage 2f extending straightly in the merged fluid flow passage 2c formed in the flow passage structure 1 is opened at the first end surface 4a of the body section 4, each second return bend 2h connected to the other end of each straight flow passage 2f is opened at the second end surface 4b of the body section 4, and the first lid section 6 sealing the opening of the first return bend 2g and the second lid section 8 sealing the opening of the second return bend 2h are attachable to and detachable from the body section 4. For this reason, in a case where precipitates or foreign substances block the straight flow passage 2f of the merged fluid flow passage 2c, when the first lid section 6 and the second lid section 8 are separated from the body section 4 by releasing the bolt 12 that fastens the lid sections, it is possible to remove the precipitates or foreign substances by straightly inserting a cleaning unit into the straight flow passage 2f from the first end surface 4a of the body section 4 through the opening of the first return bend 2g or from the second end surface 4b through the opening of the second return bend 2h. Further, in a case where precipitates or foreign substances block the respective return bends 2g and 2h of the merged fluid flow passage 2c, when the first lid section 6 and the second lid section 8 that seal the openings of the return bends 2g and 2h are separated from the body section 4, it is possible to directly clean the inside of the return bends 2g and 2h through the openings of the return bends 2g and 2h. As described above, in this embodiment, even when the merged fluid flow passage 2c has a tortuous shape which is formed by alternately connecting a portion extending straightly toward one side and a portion extending straightly from the downstream side of the portion to the other side, the inside of the merged fluid flow passage 2c may be sufficiently and easily cleaned.

Further, in this embodiment, the first introduction path 2a of each circulation path 2 extends straightly from the first introduction port 2d of the first introduction path 2a opened at the first end surface 4a of the body section 4 toward the second end surface 4b so as to be connected to the upstream end of the merged fluid flow passage 2c, and the second introduction path 2b of each circulation path 2 extends straightly from the second introduction port 2e of the second introduction path 2b opened at the third end surface 4c of the body section 4 toward the fourth end surface 4d so as to be connected to the upstream end of the merged fluid flow passage 2c. For this reason, the cleaning unit may be inserted straightly into each first introduction path 2a from the first end surface 4a of the body section 4 toward the second end surface 4b through the first introduction port 2d of the first introduction path 2a, and the cleaning unit may be inserted straightly into each second introduction path 2b from the third end surface 4c of the body section 4 toward the fourth end surface 4d through the second introduction port 2e of the second introduction path 2b. For this reason, even when precipitates or foreign substances block each first introduction path 2a or each second introduction path 2b, the inside of the introduction paths 2a or 2b may be sufficiently and easily cleaned by removing the precipitates or foreign substances.

Further, in this embodiment, since the first supply flow passage 2j is formed in the first lid section body 6a, the first lid section 6 may be used as the supply side header having the first supply flow passage 2j that distributes the first fluid to the first introduction ports 2d of plural circulation paths 2. For this reason, the number of components may be decreased compared to the case where the supply side header is provided separately from the first lid section 6.

Further, in this embodiment, since the collection flow passage 2o is formed in the second lid section body 8a, the second lid section 8 may be used as the collection side header having the collection flow passage 2o that merges and collects the fluid derived from the derivation ports 2i of the plural circulation paths 2. For this reason, the number of components may be decreased compared to the case where the collection side header is provided separately from the second lid section 8.

Further, in this embodiment, the base member 20 for forming the flow passage structure 1 is cut along each of the first cutting line A, the second cutting line B, the third cutting line C, and the fourth cutting line D, and the body section 4, the first lid section 6, the second lid section 8, and the third lid section 10 are formed by using the main member 20a, the first member, the second member, and the third member that is obtained by the cutting operation, thereby effectively using the material. Specifically, since the first lid section body 6a is formed from the first member, the second lid section body 8a is formed from the second member, and the third lid section body 10a is formed from the third member, the material is used without any waste, and the material for forming the lid section bodies 6a, 8a, and 10a is not separately needed.

Further, in this embodiment, the body section 4, the first lid section body 6a, and the second lid section body 8a are formed by cutting the single base member 20 along the first cutting line A passing through the first return bend 2g, the second cutting line B passing through the second return bend 2h, and the third cutting line C. Accordingly, the cutting surface (the first end surface 4a) of the body section 4 along the first cutting line A and the cutting surface (the first facing surface 6d) of the first lid section body 6a become parallel surfaces that may contact each other without any gap therebetween, and the cutting surface (the second end surface 4b) of the body section 4 along the second cutting line B and the cutting surface (the second facing surface) of the second lid section body 8a become parallel surfaces that may contact each other without any gap therebetween. For this reason, the first facing surface 6d of the first lid section body 6a may closely contact the first end surface 4a of the body section 4 and the second facing surface of the second lid section body 8a may closely contact the second end surface 4b of the body section 4 while both lid section bodies 6a and 8a are coupled to the body section 4 without any particularly precise processing, thereby effectively preventing the fluid from leaking from the first return bend 2g through a gap between the first facing surface 6d and the first end surface 4a and effectively preventing the fluid from leaking from the second return bend 2h through a gap between the second facing surface and the second end surface 4b.

Furthermore, this embodiment disclosed herein is merely an example in all respects, and is not limited thereto. The scope of the present invention is expressed by the scope of claims instead of the description of the above-described embodiment, and includes the meanings equivalent to the scope of claims and all modifications within the scope.

Figure 15:
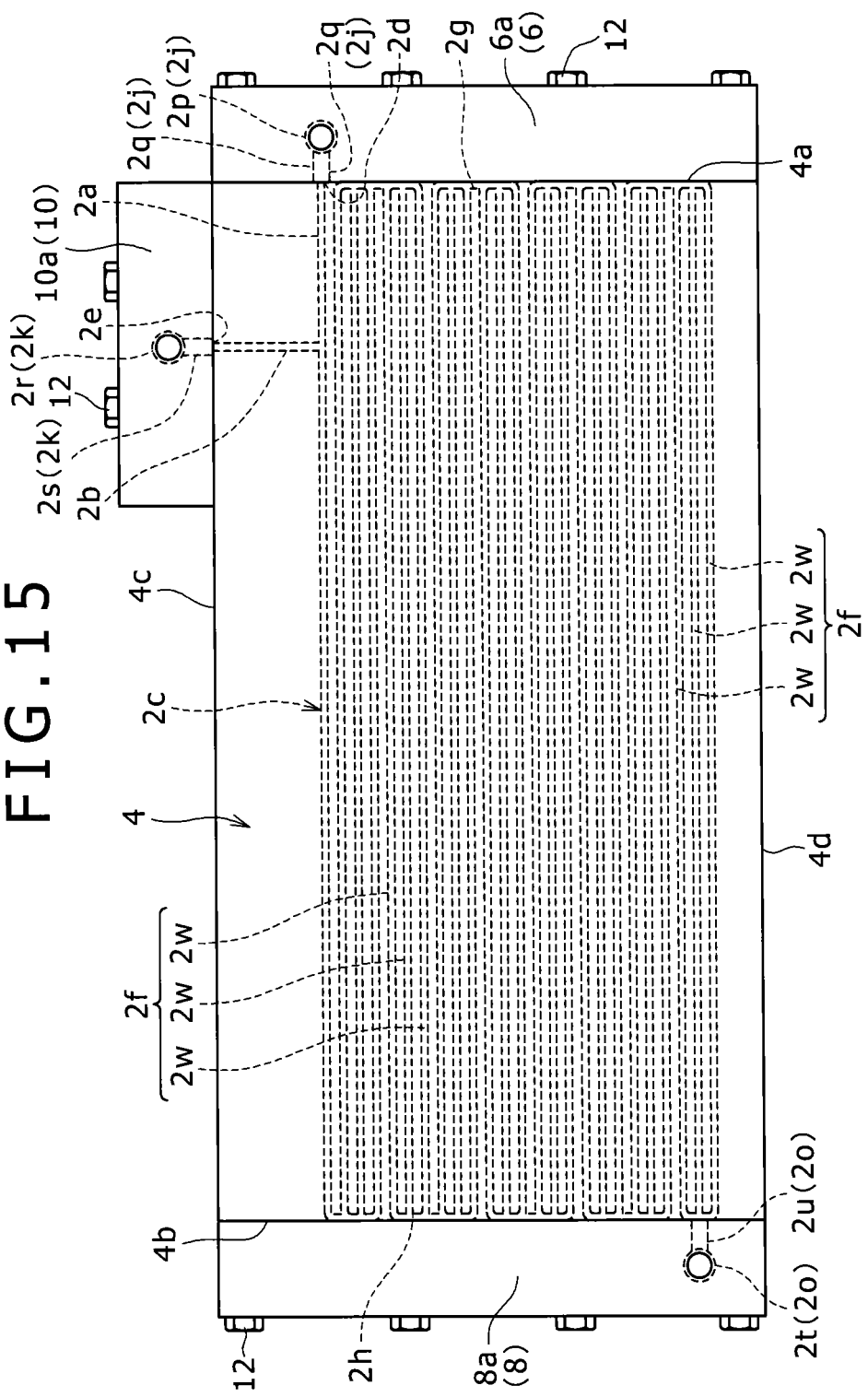
FIG. 15 is a top view that is provided to illustrate the configuration of a merged fluid flow passage of a flow passage structure according to a modified example of the embodiment of the present invention.

For example, as illustrated in FIG. 15, the straight flow passage 2f of the merged fluid flow passage 2c may include plural flow passages. Specifically, in the modified example, in plural straight flow passages 2f of the merged fluid flow passage 2c, the straight flow passage 2f other than the straight flow passage 2f connected to the first introduction path 2a and the second introduction path 2b includes three flow passages 2w that are disposed in parallel between the first end surface 4a and the second end surface 4b in a direction of connecting both end surfaces.

According to the configuration of this modified example, the amount of the fluid circulating in the straight flow passage 2f may be increased compared to the case where the straight flow passage 2f includes a single flow passage. For this reason, the fluid treatment amount causing the interaction in the merged fluid flow passage 2c may be increased.

Further, as a different modified example, the first lid section may include a first sealing member that seals the opening of the first return bend 2g formed in the first end surface 4a of the body section 4 and a first fixing member that causes the first sealing member to come into press-contact with the first end surface 4a, and the second lid section may include a second sealing member that seals the opening of the second return bend 2h formed in the second end surface 4b of the body section 4 and a second fixing member that causes the second sealing member to come into press-contact with the second end surface 4b.

Specifically, in this modified example, the first fixing member is formed as in the first lid section 6 of the above-described embodiment except that the first fixing member is not provided with the first sealing member attachment groove 6e and the first outer peripheral sealing member 6c. Further, the second fixing member is formed as in the second lid section 8 of the above-described embodiment except that the second fixing member is not provided with the second sealing member attachment groove and the second outer peripheral sealing member. Then, the first sealing member formed by a Teflon sheet (Teflon: trademark) or an aluminum sheet and the like is interposed between the first end surface 4a of the body section 4 and the first facing surface of the first fixing member formed in this way, and the first fixing member is fastened to the body section 4 by the bolt 12, so that the first sealing member comes into close contact with the first end surface 4a of the body section 4. Further, the second sealing member identical to the first sealing member is interposed between the second end surface 4b of the body section 4 and the second facing surface of the second fixing member formed as described above, and the second fixing member is fastened to the body section 4 by the bolt 12, so that the second sealing member comes into close contact with the second end surface 4b of the body section 4. Furthermore, as the first sealing member, the first sealing member is used which has a size and a shape that covers the opening formation area of the first return bend 2g of the first end surface 4a of the body section 4 and does not interfere with the opening of the first introduction port 2d. Further, as the second sealing member, the second sealing member is used which has a size and a shape that covers the opening formation area of the second return bend 2h of the second end surface 4b of the body section 4 and does not interfere with the opening of the derivation port 2i.

According to the configuration of the modified example, the openings of all first return bends 2g formed in the first end surface 4a of the body section 4 may be sealed by the first sealing member, and the openings of all second return bends 2h formed in the second end surface 4b of the body section 4 may be sealed by the second sealing member. For this reason, it is possible to reliably prevent the fluid inside the merged fluid flow passage 2c from leaking from the first return bend 2g and the second return bend 2h compared to the case where such a sealing member is not interposed between the end surface of the body section 4 and the fixing portion.

Further, the introduction path of the circulation path may be only one, and the fluid flow passage that circulates the fluid introduced into the introduction path may be connected to the single introduction path. That is, in this configuration, the fluid flow passage causes the fluid introduced into the single introduction path to flow toward the downstream side. Like the merged fluid flow passage, the fluid flow passage may have a shape which is formed by alternately connecting a portion that extends straightly toward one side and a portion that is folded back from the portion to extend straightly toward the other side.

Further, the introduction path that is connected to the merged fluid flow passage may be two or four or more.

Further, in the above-described embodiment, each straight flow passage 2f of the merged fluid flow passage 2c extends in a direction perpendicular to the first end surface 4a and the second end surface 4b of the body section 4, but each straight flow passage 2f of the merged fluid flow passage 2c may extend obliquely to some extent with respect to the first end surface 4a and the second end surface 4b of the body section 4.

Further, the first lid section that seals the opening of the first return bend formed in the first end surface of the body section may not include the supply flow passage that distributes and supplies the first fluid to the respective first introduction ports. In this case, the first lid section and the supply header having the supply flow passage may be separately provided.

Further, the second lid section that seals the opening of the second return bend formed in the second end surface of the body section may not include the collection flow passage that collects the fluid derived from the respective derivation ports. In this case, the second lid section and the discharge header having the collection flow passage may be separately provided.

Further, the flow passage structure may not be essentially provided with plural circulation paths, and only one circulation path may be provided in the flow passage structure. Further, the temperature control flow passage may not be provided in the flow passage structure.

Further, in the above-described embodiment, the first lid section, the second lid section, and the third lid section are formed by using the first member, the second member, and the third member obtained by cutting the base member, but the first lid section, the second lid section, and the third lid section may be formed by using a material different from the base member.

Further, in the above-described embodiment, the laminated substrates are integrated by diffusion-bonding the overlapping surfaces thereof in the base member forming step, but the substrates may be integrated according to a coupling method other than such a method. For example, these substrates may be integrated by solder-bonding the overlapping substrates.

Outline of Embodiment

The above-described embodiment may be summarized as below.

According to the above-described embodiment, there is provided a flow passage structure with at least one introduction path into which a fluid is introduced and at least one circulation path including a fluid flow passage which circulates the fluid introduced into the introduction path, the flow passage structure including: a body section that includes a first end surface and a second end surface facing the opposite side to the first end surface; a first lid section that is disposed so as to face the first end surface of the body section and is coupled to the body section in a removable manner; and a second lid section that is disposed so as to face the second end surface of the body section and is coupled to the body section in a removable manner, wherein the fluid flow passage includes a plurality of straight flow passages that extend between the first end surface and the second end surface inside the body section in a direction of connecting both end surfaces and is disposed in parallel with a gap in a direction intersecting the extension direction, a first return bend that connects the downstream end of the straight flow passage through which the fluid flows from the second end surface toward the first end surface among the plurality of straight flow passages to the upstream end of the straight flow passage which is disposed at the downstream side of the straight flow passage and is adjacent to the straight flow passage, and a second return bend that connects the downstream end of the straight flow passage through which the fluid flows from the first end surface toward the second end surface among the plurality of straight flow passages to the upstream end of the straight flow passage which is disposed at the downstream side of the straight flow passage and is adjacent to the straight flow passage, wherein the first return bend is opened at the first end surface, wherein the second return bend is opened at the second end surface, wherein the first lid section is coupled to the body section while contacting the first end surface so as to seal the opening of the first return bend formed in the first end surface, and wherein the second lid section is coupled to the body section while contacting the second end surface so as to seal the opening of the second return bend formed in the second end surface.

In the flow passage structure, the fluid flow passage includes the plurality of straight flow passages that extend between the first end surface and the second end surface of the body section in a direction of connecting both end surfaces and are disposed in parallel with a gap in a direction intersecting the extension direction, the first return bend that connects the downstream end of the straight flow passage through which the fluid flows from the second end surface toward the first end surface among the plurality of straight flow passages to the upstream end of the straight flow passage which is disposed at the downstream side of the straight flow passage and is adjacent to the straight flow passage, and the second return bend that connects the downstream end of the straight flow passage through which the fluid flows from the first end surface toward the second end surface among the plurality of straight flow passages to the upstream end of the straight flow passage which is disposed at the downstream side of the straight flow passage and is adjacent to the straight flow passage, therefore the fluid flow passage is formed in a shape which is formed by alternately connecting a portion extending toward one side and a portion extending toward the other side at the downstream side of the portion. Then, since the first return bend is opened at the first end surface of the body section, the second return bend is opened at the second end surface of the body section, and the first lid section sealing the opening of the first return bend and the second lid section sealing the opening of the second return bend are attachable to or detachable from the body section, when precipitates or foreign substances block the inside of the straight flow passage of the fluid flow passage, the precipitates or foreign substances may be removed by straightly inserting the cleaning unit into each straight flow passage from the first end surface or the second end surface of the body section after separating the first lid section and the second lid section from the body section. Further, when precipitates or foreign substances block the inside of each return bend of the fluid flow passage, the inside of the return bend may be directly cleaned through the opening of the return bend after separating the lid section sealing the opening of the return bend from the body section. As described above, in the flow passage structure, even when the fluid flow passage has a shape which is formed by alternately connecting the portion extending toward one side and the portion extending toward the other side at the downstream side of the portion, the inside of the fluid flow passage may be sufficiently and easily cleaned.

In the flow passage structure, the introduction path may include an introduction port that introduces the fluid into the introduction path, the introduction port may be opened at a predetermined portion of an outer surface of the body section, and the introduction path may extend straightly from the introduction port inside the body section and may be connected to the fluid flow passage.

According to this configuration, since the inside of the introduction path may be cleaned by straightly inserting the cleaning unit into the introduction path from the introduction port of the introduction path, the inside of the introduction path may be also sufficiently and easily cleaned in addition to the inside of the fluid flow passage.

In the flow passage structure, the introduction path may include an introduction port that introduces the fluid into the introduction path, at least the one introduction path may include a specific introduction path that includes the introduction port opened at the first end surface, the flow passage structure may include a plurality of circulation paths, and the first lid section may be provided with a supply flow passage that is connected to each introduction port of the specific introduction paths of the plurality of circulation paths while the first lid section is coupled to the body section so as to distribute and supply the fluid to each introduction port.

According to this configuration, the first lid section may be used as the supply side header that includes the supply flow passage for distributing the fluid to the introduction ports of the specific introduction paths of the plural circulation paths. For this reason, the number of components may be decreased compared to the case where the supply side header is provided separately from the first lid section.

In the flow passage structure, the flow passage structure may include the plurality of circulation paths, the fluid flow passage of each circulation path may include a derivation port that is opened at the second end surface of the body section and derives the fluid from the inside of the fluid flow passage, and the second lid section may be provided with a collection flow passage that is connected to each derivation port of the fluid flow passages of the plurality of circulation paths while the second lid section is coupled to the body section, so as to merge and collect the fluid derived from each derivation port.

According to this configuration, the second lid section may be used as the collection side header that includes the collection flow passage for merging and collecting the fluids derived from the derivation ports of the fluid flow passages of the plural circulation paths. For this reason, the number of components may be decreased compared to the case where the collection side header is provided separately from the second lid section.

In the flow passage structure, the circulation path may include a plurality of introduction paths, and the fluid flow passage of the circulation path may be connected to the plurality of introduction paths so as to circulate the respective merged fluids introduced into the respective introduction paths.

According to this configuration, even when a product is formed by the interaction, for example, the chemical reaction between the plural fluids of the merged fluids of the fluid flow passage and the product blocks the inside of the fluid flow passage, the product may be easily removed.

In the flow passage structure, each straight flow passage may include a plurality of flow passages that are disposed in parallel and extends between the first end surface and the second end surface in a direction of connecting both end surfaces.

According to this configuration, the amount of the fluid circulated in the straight flow passage may be increased compared to the case where the straight flow passage includes a single flow passage. For this reason, the fluid treatment amount (the circulation amount) of the fluid flow passage may be increased.

In the flow passage structure, the first lid section may include a first sealing member that seals the opening of the first return bend formed in the first end surface and a first fixing member that is coupled to the body section in a removable manner, interposes the first sealing member between the first end surface and the first fixing member while being coupled to the body section, and causes the first sealing member to closely contact the first end surface so that the first sealing member seals the opening of the first return bend, and the second lid section may include a second sealing member that seals the opening of the second return bend formed in the second end surface and a second fixing member that is coupled to the body section in a removable manner, interposes the second sealing member between the second end surface and the second fixing member while being coupled to the body section, and causes the second sealing member to closely contact the second end surface so that the second sealing member seals the opening of the second return bend.

According to this configuration, since the first sealing member may seal the opening of the first return bend of the fluid flow passage and the second sealing member may seal the opening of the second return bend of the fluid flow passage, it is possible to reliably prevent the fluid inside the fluid flow passage from leaking from the first return bend and the second return bend.

According to the present invention, there is provided a method of manufacturing the flow passage structure including: forming a base member having a circulation path formed therein; cutting the base member along a first cutting line that extends in a direction intersecting the extension direction of each straight flow passage and passes through the first return bend and a second cutting line that extends in a direction intersecting the extension direction of each straight flow passage and passes through the second return bend; forming the body section by a portion between the first cutting line and the second cutting line of the base member cut in the cutting of the base member; forming the first lid section by a portion outside the first cutting line of the base member cut in the cutting of the base member; and forming the second lid section by a portion outside the second cutting line of the base member cut in the cutting of the base member.

In the method of manufacturing a flow passage structure, since the body section is formed in the portion between the first cutting line and the second cutting line of the base member, the first lid section is formed by the portion located outside the first cutting line cut from the base member, and the second lid section is formed by the portion located outside the second cutting line cut from the base member, the material may be effectively used. Specifically, in a case where the body section is formed by cutting the base member and the first lid section and the second lid section are formed by using another member, the portion other than the portion used for the body section in the base member is discarded. Accordingly, the material is used uneconomically, and the material for forming the first lid section and the second lid section is further needed. On the contrary, in the method of manufacturing the flow passage structure of the present invention, the portion other than the portion used for the body section in the base member may be used for the first lid section and the second lid section, the material is used without any waste, and the additional material is not needed. Further, in this manufacturing method, since the body section, the first lid section, and the second lid section are formed by cutting the single base member along the first cutting line passing through the first return bend and the second cutting line passing through the second return bend, the cutting surface of the body section and the cutting surface of the first lid section along the first cutting line become parallel surfaces that may contact without any gap therebetween, and the cutting surface of the body section and the cutting surface of the second lid section along the second cutting line become parallel surfaces that may contact without any gap therebetween. For this reason, the cutting surfaces of both lid sections may closely contact the corresponding cutting surface of the body section while both lid sections are coupled to the body section without any particular processing. Accordingly, it is possible to effectively prevent the fluid from leaking from the first return bend between the cutting surface of the first lid section and the corresponding cutting surface of the body section and to effectively prevent the fluid from leaking from the second return bend between the cutting surface of the second lid section and the corresponding cutting surface of the body section.

As described above, according to the above-described embodiment, even when the fluid circulation flow passage of the flow passage structure is formed in a shape which is formed by alternatively connecting a portion extending toward one side and a portion extending toward the other side at the downstream side thereof, the inside of the flow passage may be sufficiently and easily cleaned.

The invention claimed is:
1. A flow passage structure comprising:
    a body section that includes a first end surface and a second end surface at a side of the body that is opposite to the first end surface;
    a first lid section that is disposed to cover the first end surface of the body section and is coupled to the body section in a removable manner;
    a second lid section that is disposed to cover the second end surface of the body section and is coupled to the body section in a removable manner and
    at least one circulation path comprising a micro-channel with a minute flow passage diameter, the at least one circulation path including a fluid flow passage in the body section, the fluid flow passage comprising a first introduction path into which a first fluid may be introduced and a second introduction path into which a second fluid may be introduced, wherein the first introduction path and the second introduction path are joined in the body section to merge the first fluid and the second fluid, the fluid flow passage further comprising a merged fluid flow passage having a tortuous shape, wherein the merged fluid flow passage comprises:
        a plurality of straight flow passages that extend between the first end surface and the second end surface inside the body section in a direction of connecting the first and second end surfaces, wherein the plurality of straight flow passages are disposed in parallel with one another and are mutually spaced with a gap in a direction intersecting the direction in which the straight flow passages extend,
        a first return bend that connects a downstream end of a first straight flow passage among the plurality of straight flow passages, through which first straight flow passage the fluid can flow from the second end surface toward the first end surface, to an upstream end of a second straight flow passage among the plurality of straight flow passages, through which second straight flow passage the fluid can flow from the first end surface toward the second end surface, which upstream end of the second straight flow passage is disposed adjacent the downstream end of the first straight flow passage, and
        a second return bend that connects a downstream end of the second straight flow passage to an upstream end of a third straight flow passage among the plurality of straight flow passages, through which third straight flow passage the fluid can flow from the second end surface toward the first end surface, which upstream end of the third straight flow passage is disposed adjacent the downstream end of the second straight flow passage,
    wherein the first return bend defines an opening at the first end surface, wherein the second return bend defines an opening at the second end surface, wherein the first lid section is coupled to the body section while contacting the first end surface so as to seal the opening of the first return bend formed in the first end surface, and wherein the second lid section is coupled to the body section while contacting the second end surface so as to seal the opening of the second return bend formed in the second end surface.

2. The flow passage structure according to claim 1, wherein each of the first and second the introduction paths includes an introduction port that introduces the fluid into the respective introduction path, wherein the introduction port of each respective introduction path is opened at a predetermined portion of an outer surface of the body section, and wherein each respective introduction path extends straightly from the introduction port inside the body section and is connected to the merged fluid flow passage.

3. The flow passage structure according to claim 1, wherein the at least one introduction path includes an introduction port that introduces the fluid into the introduction path, wherein one of the first and second introduction paths is a specific introduction path that includes the introduction port opened at the first end surface, wherein the flow passage structure includes a plurality of the circulation paths, and wherein the first lid section is provided with a supply flow passage that is connected to introduction ports of specific introduction paths of all of the plurality of circulation paths while the first lid section is coupled to the body section so as to distribute and supply the fluid to each of the introduction ports.

4. The flow passage structure according to claim 1, wherein the flow passage structure includes a plurality of the circulation paths, wherein the fluid flow passage of each circulation path includes a derivation port that is opened at the second end surface of the body section and derives the fluid from the inside of the fluid flow passage, and wherein the second lid section is provided with a collection flow passage that is connected to each derivation port of the fluid flow passages of the plurality of circulation paths while the second lid section is coupled to the body section so as to merge and collect the fluid derived from each derivation port.

5. The flow passage structure according to claim 1, wherein each of the straight flow passages includes a plurality of flow passages that are disposed in parallel and extend between the first end surface and the second end surface in a direction of connecting both of the end surfaces.

6. The flow passage structure according to claim 1, wherein the first lid section includes a first sealing member that seals the opening of the first return bend formed in the first end surface and a first fixing member that is coupled to the body section in a removable manner, the first sealing member being interposed between the first end surface and the first fixing member while being coupled to the body section, and causes the first sealing member to closely contact the first end surface so that the first sealing member seals the opening of the first return bend, and wherein the second lid section includes a second sealing member that seals the opening of the second return bend formed in the second end surface and a second fixing member that is coupled to the body section in a removable manner, the second sealing member being interposed between the second end surface and the second fixing member while being coupled to the body section, and causes the second sealing member to closely contact the second end surface so that the second sealing member seals the opening of the second return bend.

* * * * *